(12) United States Patent
Maroon

(10) Patent No.: US 8,369,116 B2
(45) Date of Patent: Feb. 5, 2013

(54) ISOLATED DC-TO-DC POWER CONVERTER TOPOLOGY

(76) Inventor: Raymond Peter Maroon, Encinitas, CA (US)

( * ) Notice: Subject to any disclaimer, the term of this patent is extended or adjusted under 35 U.S.C. 154(b) by 425 days.

(21) Appl. No.: 12/715,108

(22) Filed: Mar. 1, 2010

(65) Prior Publication Data

US 2011/0211378 A1 Sep. 1, 2011

(51) Int. Cl.
*H02M 3/18* (2006.01)

(52) U.S. Cl. .............................. 363/61; 363/88; 363/125

(58) Field of Classification Search .................... 363/61, 363/62, 67, 88, 89, 90, 125, 126, 127
See application file for complete search history.

(56) References Cited

U.S. PATENT DOCUMENTS

| | | | |
|---|---|---|---|
| 4,618,919 A | 10/1986 | Martin, Jr. | |
| 4,675,797 A | 6/1987 | Vinciarelli | |
| 4,698,740 A | 10/1987 | Rodgers et al. | |
| 4,814,672 A | 3/1989 | Dieterle et al. | |
| 4,893,228 A | 1/1990 | Orrick et al. | |
| 5,023,767 A | 6/1991 | Lopez et al. | |
| 5,321,597 A | 6/1994 | Alacoque | |
| 6,038,142 A | 3/2000 | Fraidlin et al. | |
| 6,344,979 B1 | 2/2002 | Huang et al. | |
| 6,434,021 B1 * | 8/2002 | Collmeyer et al. | 363/21.01 |
| 6,583,994 B2 * | 6/2003 | Clayton et al. | 363/21.18 |
| 6,590,788 B2 | 7/2003 | Mercier | |
| 7,016,204 B2 * | 3/2006 | Yang et al. | 363/21.13 |
| 7,272,020 B2 | 9/2007 | Lehman et al. | |
| 7,463,497 B2 | 12/2008 | Negrete | |
| 7,471,522 B2 | 12/2008 | Ng et al. | |
| 7,561,452 B2 | 7/2009 | Mednik et al. | |
| 7,834,561 B2 * | 11/2010 | Fong et al. | 315/307 |

OTHER PUBLICATIONS

Yilei Gu, et. al., Three-Level LLC Series Resonant DC/DC Converter, IEEE Transactions on Power Electronics, Jul. 2005, pp. 781-789, vol. 20, No. 4, IEEE, Publications Office,10662 Los Vaqueros Circle, P.O. Box 3014, Los Alamitos, CA 90720-1264 USA.
Robert L. Steigerwald, A Comparison of Half-Bridge Resonant Converter Topologies, IEEE Transactions on Power Electronics, Apr. 1988, pp. 174-182, vol. 3, No. 2, IEEE, Publications Office,10662 Los Vaqueros Circle, P.O. Box 3014, Los Alamitos, CA 90720-1264 USA.
Author Unknown, "AN2450 Application note, LLC resonant half-bridge converter design guideline". Oct. 2007. Revision 5. 32 pages. ST Microelectronics. http://www.st.com/stonline/products/literature/an/12784.pdf.
Hang-Seok Choi, "Application Note AN-4151, Half-bridge LLC Resonant Converter Design Using FSFR-series Fairchild Power Switch (FPSTM)". Oct. 2007; Revision 1.0.0. 17 pages. Fairchild Semiconductor Corporation. http://www.fairchildsemi.com/an/AN/AN-4151.pdf#page=1.

(Continued)

*Primary Examiner* — Nguyen Tran

(57) ABSTRACT

New utility of an existing class of DC galvanically isolated current sourcing circuit topologies for power conversion simultaneously allows improvement in its secondary circuit(s) to power conversion efficiency and reduction in working voltage magnitudes, or simply reduction in working voltage magnitudes, with resulting benefits for reduction in manufacturing cost, reduction in size and weight, and increase in market acceptance, or may simply allow secondary circuit(s) to enable easier provisioning of safety, improvement in reliability, or improvement in efficiency. The magnitude of DC output voltage is optimized at higher value for greater efficiency, while simultaneously optimizing the secondary circuit's working voltage maximum magnitude at a lower value for greater safety. The method requires full cycle current-compliant input impedance of the secondary power source whereby the secondary of the DC galvanically isolating device behaves in a mode of being a full cycle voltage-compliant current source.

20 Claims, 5 Drawing Sheets

OTHER PUBLICATIONS

Bob Mammano, Lal Bahra, "Safety Considerations in Power Supply Design". 2005. 14 pages. Texas Instruments, Post Office Box 655303 Dallas, Texas 75265. http://www.ti.com/.

"AN9003-9 A Users Guide to Intrinsic Safety". 20 pages. Oct. 2006, MTL Instruments, Power Court, Luton, Bedfordshire, England LU1 3JJ. http://www.flp.co.za/intrinsic-safety/AN9003-9.pdf.

* cited by examiner

ISOLATED DC-TO-DC POWER CONVERTER TOPOLOGY

FIELD OF THE INVENTION

The present invention is directed to a method and apparatus for utility to optimize a direct-current to direct-current power conversion process simultaneously for higher efficiency and for lower limit on the maximum magnitude of working voltages in output circuit(s), or to optimize only for lower limit on the maximum magnitude of working voltages in output circuit(s).

BACKGROUND OF THE INVENTION

All electrical power converters delivering direct-current power to a load, and deriving this power from an alternating-current source, must process it through at least one stage performing a rectification function. Output circuits comprise secondaries, and secondaries comprise secondary circuits. In the case of switch mode (SM) power conversion with direct-current galvanically isolated secondaries there are typically a minimum of two stages where rectification occurs, the second of such being in the secondary circuit. All direct-current to direct-current SM power converters with direct-current galvanically isolated secondaries have at least one stage where rectification occurs, located in the secondary circuit.

Greater power conversion efficiency results in the secondary circuit from having greater output load voltages, where the increases to the value of output load voltage has the greatest incremental influence on increases to efficiency when the ratio of that load voltage magnitude to the combined voltage magnitudes of forward voltage drops of the secondary rectifier(s) and stray impedance(s) is smallest, this being true due to the same current conducting through the forward voltage drop of the output load also conducting through the power dissipative forward voltage drops of the rectifier(s) and stray impedance(s).

The terms rectification, rectifier, or rectifier(s), as used herein shall also be construed to signify and comprise any means of rectifier optimization such as synchronous rectification that may include but not be limited to diodes, MOSFETs, MOSFETs and diodes, active switching devices, active switching devices and diodes.

There is increasing market emphasis on producing or procuring solutions for power conversion that are optimized to be efficient, delivering a high percentage of the electrical power they consume from their supplies into electrical power available to their loads. Emphasis on efficiency is due in some applications to market emphasis on optimizing for low total cost of ownership (TCO) of an electrical system, especially where a favorable TCO result is necessary to justify a high initial expenditure for purchase of a system, or in an industry where lowering operating cost is essential to maintaining or improving profitability, cost-competitiveness, or market viability. There is also increasing emphasis on so-called energy efficiency as a national priority in the United States and other countries that are net energy importers. Energy-efficiency encompasses power conversion efficiency, but above all signifies prioritizing efficaciousness of energy utilization.

An electrical system may comprise power conversion apparatus, cooling apparatus, fixture and housing apparatus, and an output electrical load apparatus. One example of an electrical system where market emphasis is on TCO is that of a luminaire utilizing power LEDs for light generation, where a favorable TCO benefit analysis is often pivotal to a decision by market participants to engage said LED technology through the adoption of system embodiment that successfully preserves at the system level the sought benefit of an efficacious light source that the LEDs embody at their elemental level. The electrical system of the example luminaire should be capable of supporting a favorable TCO analysis by offering low operating costs through having its power conversion efficiency optimized to a suitable level, while limiting the cost of its manufacture through inherently less costly cooling apparatus enabled by higher efficiency, and inherently less costly housing apparatus afforded by a lower maximum secondary working voltage magnitudes.

For purposes of illustration to demonstrate the effect upon efficiency of the secondary rectifier(s) in an power conversion apparatus, the LED load voltage in a typical luminaire application due to a load comprising a single LED, or several LEDs receiving their power in parallel connection, is assumed to be approximately 3 volts, where an additional forward voltage drop of each current conducting rectifier series electrically connected between transformer output and output load in the secondary circuit may be assumed to be between 0.3 volts and 1.2 volts, and where other additional forward voltage drops due to stray and other impedances also series electrically connected in the secondary circuit between transformer output and output LED load may be assumed to be insignificant by comparison.

In the case of the example electrical system, an output load may be redesigned so it is optimized to support greater load voltage, either by reconfiguring its LED load to have its several parallel LEDs electrically connected instead in series, or reconfiguring its load comprising only a single LED by replacing it with multiple lower luminosity LEDs electrically connected in series so that they have equivalent total luminosity as the single LED being replaced. It should be assumed for the sake of simplicity with this first illustration that output power remains constant as a function of overall luminosity remaining constant, so LED load current will be decreased as a result of the LED load voltage having been increased for this comparison at constant luminosity between original configuration and reconfigured loads, given that output power is identical for both cases, where power is calculated as the product of load current and load voltage. Higher load voltage will result in higher electrical efficiency than lower load voltage for a constant power load, due to relative reduction in electrical power being dissipated by a decreased load current conducting through the forward drop of the rectifier(s) series electrically connected in the secondary circuit between transformer output and output LED load, compared with the unchanged electrical power continuing to be delivered to the higher voltage of the reconfigured LED output load.

One may analyze a second case using this example, where the load current remains unchanged and output load voltage as well as output power is increased. For any given load current in this second case, efficiency is increased due to the increased output load voltage magnitude, and its consequence of a now increased proportion of power delivered to the output load, relative to an unchanged amount of power dissipation due to current conducting through the forward drop of the secondary rectifier(s).

To increase efficiency by increasing output load voltage using a current-compliant voltage source (CCVS) class of topologies would entail a transformer that behaves as a CCVS, which would result in working voltage magnitudes in secondary circuit(s) significantly exceeding the voltage magnitude of the output load, due to the voltage compliant behavior of inductor(s) series electrically connected in secondary circuit(s) conducting current for use by the output load(s), said voltage magnitudes possibly increasing the risk of electric shock to operators who come into physical contact with bare conductors in said secondary circuit(s), or increasing risk of fire or explosion in certain environments. To meet a need for safety in the case of operators coming into physical contact with electrically conductive elements, the power industry has adopted a discipline of redundancy, or equivalent redundancy, regarding electrical insulation systems and maximum permissible working voltage magnitudes; and required that in those situations that safety be maintained despite any single failure occurring. In the case of protecting against fire or explosion in certain high risk environments, criteria are established to maintain working voltage magnitudes below permissible maximum limits despite the simultaneous occurrence of any two failures. It can be anticipated that other cases exist that require criteria be met for an even higher degree of redundancy protection, such as in so-called mission critical applications.

An operator may be afforded safety protection from electric shock due to physical contact with voltage present on bare conductors of the output load if the secondary circuit ensures that under normal conditions, or due to a single fault, the maximum voltage level considered to be safe shall not be exceeded on the bare conductor of the output load. To address this need a voltage monitor circuit for over-voltage fault detection may be employed that acts to ensure no over-voltage condition exists at the secondary's output terminals due to any single fault, and in addition the secondary circuit must be constructed to insulate against electric shock by some inherent means such as a grounded or insulated housing protecting the operator from exposure to bare conductors of the secondary circuit exclusive of its output terminals. In the example of a luminaire, where for instance it may be desired to allow an operator to simply screw-in a replacement as for incandescent bulbs by using LED luminaire systems with similar form and function to that of an incandescent bulb, this requirement for a housing of secondary circuits may pose a difficulty assuming no grounding point is available, such as is the case with a traditional incandescent light bulb for instance, and that an appropriate insulating enclosure protecting bare conductors in the secondary circuit from operator contact would be difficult to implement while retaining TCO benefits to luminaire of efficacious LED technology due to reduced housing volume.

A requirement therefore that is often imposed on any successful solution to an application such as illustrated by the luminaire example is that of electrical safety for the operator. Electrical safety is a function of the human body's tolerance to applied voltage, reduction to the risk that an operator may come into physical contact with hazardous voltages, and limiting the maximum magnitudes for the two types of voltages that an operator may come into contact with, direct-current or alternate-current. Safety related to electrical circuits is also a function of addressing circumstances of certain environmental conditions which may allow for increased risk of fire or explosion, and mitigating against these effects by ensuring voltages do not exceed certain thresholds despite the possibility of multiple simultaneous faults occurring. Criteria that address electrical safety provisions for providing protection from electrical shock are found in several industry-accepted electrical standards such as described in the cited reference document: Bob Mammano, Lal Bahra, "Safety Considerations in Power Supply Design", Texas Instruments. Criteria that address electrical related safety provisions for providing protection from risk of igniting a fire or explosion are found in several industry-accepted electrical standards such as described in the cited reference document: "AN9003-9 A Users Guide To Intrinsic Safety", October 2006, MTL Instruments, Power Court, Luton, Bedfordshire, England. A circuit may qualify for the classification of 'Extra Low Voltage' (ELV) if it protects against the risk of electric shock due to hazardous voltages in the event an operator comes into physical contact with its bare conductors. If protection continues to be effective in the event of any single fault, the circuit may qualify for classification of 'Safety Extra Low Voltage' (SELV). If protection continues to be effective, as defined for hazardous environments, in the event of any two simultaneous faults, the circuit may qualify for classification of 'Intrinsically Safe' (IS).

The subject circuit being considered for its electrical safety or related environmental safety may be an output load, the output terminals of a secondary circuit, or the secondary circuit. Any circuit connected to another may be able to share the same benefit of safety voltage class under usual circumstances. An output load is at a minimum a secondary circuit if it is connected only to the output terminals of a secondary circuit. If said secondary circuit's output terminals are classified SELV due to limiting its maximum voltage magnitude under both normal or fault conditions, and the output load is incapable of producing higher voltage magnitudes than it is supplied by the secondary circuit, then the output load may also be classified SELV. Output terminals of a secondary circuit may be classified SELV without requiring its secondary circuit be so classified, if no non-SELV bare conductors are external to the secondary circuit enclosure, and if non-SELV bare conductors internal to the secondary circuit are inaccessible to an operator; and if an over-voltage fault detection and fault limit circuit is employed to monitor voltage at said accessible terminals that acts sufficiently fast in event of a fault to prevent from appearing on said terminals any higher voltage magnitude than intended within the criteria for classification of SELV circuits. In this case it is not necessary for a secondary circuit to be rated SELV, in order for the load to be SELV. A common practice used with non-SELV secondary circuits to ensure electrical safety is to employ a grounded conductive housing enclosure, meeting established material and structural requirements, suitable for making bare conductors in the secondary exclusive of its output terminals inaccessible to an operator. Satisfying an isolation requirement of a non-SELV secondary circuit in order to have its output terminals and output load rated SELV imposes additional manufacturing costs and physical space requirements upon the system design, than would be the case where the secondary circuit is classified SELV. An advantage for an electrical system due to having secondary circuits rated SELV would therefore result in more favorable TCO analysis, in cases where it is a requirement that the load must be SELV. A further advantage for an electrical system, which is due to having higher secondary circuit efficiency, would result in less costly cooling apparatus, fixturing apparatus and housing apparatus, therefore lower cost to manufacture electrical system with subsequently more favorable TCO analysis being made possible.

Transformers are useful for meeting a requirement of secondary circuits to be direct-current galvanically isolated from hazardous working voltages on primary conductors. Standards described herein define specific classes of insulation as being 'functional', 'basic', 'supplemental', 'double', or 'reinforced'; and further describe substituting a grounded enclosure as an option in lieu of a transformer's supplemental insulation. The transformer construction may employ insulation that is classified as 'functional insulation'. 'Functional insulation' does not provide protection against electric shock, or provide safety, it being assumed to possibly have small defects. 'Basic insulation' does provide basic protection against electric shock, but does not provide safety. 'Supplementary insulation' also provide basic protection against electric shock, but does not provide safety, however may be used together with basic insulation so that the insulation system comprising both basic and supplementary insulation is classified as 'double insulation', which does provide electrical safety protection under normal conditions or in the event of any single fault. 'Reinforced insulation' is a single-insulation system equivalent to double insulation in providing electrical safety protection. Other requirements for ELV and SELV classification such as minimum distances for creepage and clearance, insulation temperature class and maximum allowed hot spot temperature, and more, are further specified in the criteria herein described in the cited reference document: Bob Mammano, Lal Bahra, "safety Consideration in Power supply design", Texas Instrumants. For a secondary circuit to be classified as SELV when it is magnetically coupled through any transformer(s) to a primary circuit, besides having said maximum limits on its secondary voltage magnitudes it is required that the transformer insulation system be either 'double' or 'reinforced' type. It is possible to substitute a protective earth shield, comprising a conductive grounded enclosure, in place of 'supplementary' insulation and, together with 'basic' insulation, satisfy SELV criteria for an insulation system. Circuits so classified ELV or SELV must not have working voltage magnitudes that exceed limits given in relevant standards: for example, 42.4 Volts alternating-current; or 60 Volts direct-current. One advantage of having a circuit classified SELV instead of ELV is that an operator may be permitted safe unrestricted access to its bare circuit components.

Another classification that describes limited exposure levels for voltages in order to address electrical safety hazard concerns is that of 'Telecommunications Network Voltage' (TNV), where the normal operating voltage magnitudes may not exceed, for example, 71 Volts alternating-current or 120 Volts direct-current, with an additional condition that the operator-accessible contact area is limited only to the surface of an exposed connector pin. Voltage magnitudes may be somewhat greater for limited time durations, as further described in industry-accepted relevant extant standards.

It would represent an advancement to the art if a means were provided to those of ordinary skill in the art for choosing and utilizing an optimal power converter topology, or class of topologies, which allows simultaneous improvement to secondary circuit efficiency and reduction in secondary circuit working voltage magnitudes. In order to proceed with developing a framework within which to explore how working voltages are imposed in secondary circuits, towards a goal of seeking methods to limit those voltage magnitudes reliably in the context of electrical safety, it is essential to understand the difference in behavior between impedances differentiating between those that are voltage-compliant and those that are current-compliant, and to understand how the impedance of a secondary circuit may be compliant with compatible sourcing behavior of the primary circuit from which it receives its power. It is also essential to understand the relationship between output load voltage magnitude and secondary circuit working voltage magnitude levels in order to increase secondary circuit efficiency through higher load voltage magnitude levels, while promoting secondary circuit electrical or related environmental safety through lower working voltage magnitude levels.

It should be understood that power converters are often manufactured and made available for sale to the market without attached loads. To increase generality of this description, the terms 'load voltage', 'output voltage', and 'output terminal voltage' may be used to essentially signify the same differential voltage, said differential voltage appearing at the output terminals of the power converter whether those terminals are real or virtual, and whether the power converter is supplying an external load, an internal load, or is unloaded.

Many SM electrical power converters employ transformers to provide direct-current galvanic isolation between their input, herein called primary in the case of connection to primary circuits connected directly to the mains or other sources having hazardous voltage levels, and their output, herein called secondary; and in addition transformers perform power transformation from one set of current and voltage variables received as input on their primary into another that they produce as output on their secondary. Alternating-current current and alternating-current voltage are received as inputs by the direct-current galvanically isolating transformer due to their generation through the forcing function actions of an primary alternating-current power stage, generally involving electronic power switches that are controlled to be either on, or off, and cycled continuously to produce a periodic voltage waveform. A capacitor may be connected in series between this periodic voltage waveform, which may include a direct-current component, and the input to the primary of the transformer. One purpose of the capacitor is to allow higher frequency components to conduct but to block direct-current components from reaching the primary of the direct-current galvanically isolating transformer. The secondary circuit provides rectification of the alternating-current current that sources from the transformer output, said rectification introducing direct-current components into the rectified current. Additionally, in one class of topologies a filtering function is generally employed using a series inductor and a shunt capacitor connected in the secondary circuit, which results in achieving a low-pass function on the power converter's output voltage. In another class of topologies, only a shunt capacitor may be connected in the secondary circuit for filtering purposes. Where both alternating-current components and a series electrically connected filter inductor are present in the secondary circuit, the working voltage maximum magnitude in the secondary circuit can significantly exceed the voltage magnitude of the secondary circuit's output terminals. This secondary circuit that includes an inductor forms a voltage-compliant load to the primary circuit, and is compliant with a primary circuit that behaves as a current-compliant voltage source (CCVS).

It is understood by those of ordinary skill in the art of isolated power converter design that a direct-current galvanic isolation barrier must exist between primary and secondary circuits of isolation converters, and these barriers must adopt effective isolation means for each interface where signals or power pass between the primary and the secondary, including but not limited to feedback signals, fault signals, and control signals, as appropriate to each converter design.

A voltage-compliant current source (VCCS) can be realized through the behavior of an inductor. Inductor current cannot change instantaneously and inductor differential voltage may vary to be compliant with behavior of the circuit that it connects to. A CCVS can be realized through the behavior of a capacitor. Capacitor differential voltage cannot change instantaneously and the capacitor current may vary to be compliant with behavior of the circuit that it connects to. The characteristic of a variable type not being able to change instantaneously is termed herein as a source of that variable type. The characteristic of a variable type that is able to change instantaneously is termed herein as being compliant of that variable type.

SM power converter circuits can employ a class of VCCS topologies with full wave rectification, a class of VCCS topologies with half wave rectification, or a class of CCVS topologies, where the VCCS and CCVS designations refer to behavior of the primary power circuit acting upon the secondary power circuit. In all topologies, a rectifier is series electrically connected with the output load, and installed before any secondary circuit series inductor or secondary circuit shunt capacitor, and installed after the transformer secondary terminals, for the purpose of rectifying an alternating-current current without direct-current current on its input into a direct-current current with possible alternating-current current components, and allowing the shunt capacitor to subsequently produce a direct-current voltage component on its output with possible alternating-current voltage components.

The more traditional class of topologies involve a primary power circuit that acts as a CCVS, and the rectifier-low-pass-filter circuit combination connected in the secondary circuit comprises series rectifier followed by series inductor and shunt capacitor, which may produce a nearly direct-current voltage waveform at the secondary circuit output due to the averaging function the filter performs, retaining the direct-current component of rectified alternating-current current and attenuating the alternating-current components of filtered output voltage.

A CCVS topology does not have substantial inductance series electrically connected with the primary of the transformer, and instead has a filter inductor series electrically connected with the secondary of the transformer, where it allows the transformer secondary to behave as a CCVS, compliant with the load characteristics of imposed current behavior by the relatively high impedance of the secondary filter inductor. A special category of CCVS topologies is a phase-shift modulated quasi-resonant zero voltage switch (ZVS) topology that, besides employing a secondary circuit connected filter inductor as do other CCVS topologies, has only as much inductance intentionally connected in the primary, either as a discrete element, stray and leakage inductances, or some combination, to provide the small amount of energy, in the form of voltage-compliant current sourcing, required in order to effect so-called soft resonant transition of the switches from one state to another thereby reducing the hard-switching power losses that would otherwise result. The inductance employed in the primary circuits of these quasi-resonant schemes is insignificant in relation to that employed in their secondary circuits, said secondary filter inductance performing a low-pass filtering function in conjunction with a secondary shunt capacitor. In the CCVS class of topologies, including these quasi-resonant ZVS topologies just described, the maximum operational voltage magnitude in the secondary side circuit may be significantly higher than the maximum output load voltage magnitude. Utility of the CCVS class of topologies does allow for higher efficiency through higher output load voltage values, but at a cost of imposing working voltage magnitude values in the secondary circuit that are substantially higher than the output load voltage magnitude, and that at relatively low output voltage levels may result in hazardous voltage levels in the secondary circuit.

In any topology of the VCCS with full wave rectification class an inductor of significant value may be series electrically connected to the transformer primary. A capacitor is also electrically connected in the primary in series with the inductor. In resonant topologies of the VCCS with full wave rectification class the placement of a significant inductance in electrical series connection to the primary of the transformer, in addition to a series electrically connected capacitor and resulting resonant behavior, is motivated in some instances, at least in part, by the desire to capture an advantage of reducing the switching power losses associated with the primary switches that create the alternating-current waveform for the transformer. A rectifier that produces a direct-current component on its output by rectifying an alternating-current waveform on its input is necessary to be series electrically connected with the secondary of the transformer, as direct-current components cannot be passed through the transformer from its primary to its secondary. In this case of the VCCS with full wave rectification class of topologies the inductor series electrically connected in the primary circuit and being excited by a voltage waveform forcing function generated by cyclic on and off actions of the switches, conducts only alternating-current components as ensured by the direct-current blocking behavior of the series electrically connected capacitor. The inductor attenuates higher frequency harmonics to a greater degree than lower frequency harmonics, in so doing acts also as a low pass filter. The primary inductor and its effect as a low pass filter, as well as the primary capacitor and its effect as a high pass filter, together acting as a band-pass filter, appear in equivalent series electrical connection to the output load, and the secondary capacitor may be treated analytically as appearing in equivalent shunt connection to the trsnsformer primary, when the secondary rectifier, secondary capacitor, and output load are reflected analytically from the secondary to the primary side of the transformer. The secondary rectifier will introduce direct-current on its output, or load side, from alternating-current of the band-pass filter on its input, or transformer side. Acting together with the secondary rectifier and secondary shunt capacitor, the inductor on the primary performs a low-pass filtering operation, that produces primarily direct-current on the output terminals.

This primary circuit with its series electrically connected inductance and series electrically connected capacitance in VCCS topologies behaves resonantly when excited by forcing function frequencies near its natural frequency/ies. In the case of an inductor series electrically connected to the primary of the transformer of VCCS topologies, it is desired to allow waveforms at the forcing function switching frequency/ies to pass for the purpose of providing an alternating-current power source to the transformer's input, and at a frequency or range of frequencies for which the transformer was designed; while in the contrasting case of a filter inductor series electrically connected to the secondary of the transformer of CCVS topologies, it is desired instead by its use in conjunction with the secondary shunt capacitor only to reduce high frequency components, preserving only the direct-current component from the secondary rectifier output.

Summarizing the filter behavior then, the secondary shunt capacitor in the VCCS with full wave rectification class of topologies attenuates high frequency harmonics as it does in the case of the CCVS class of topologies, but unlike in the CCVS class of topologies must work as a filter element in conjunction with the effective primary inductance seen as reflected analytically from the primary to the secondary. The low pass filter creating a direct-current output for the resonant class of VCCS with full wave rectification topologies comprises primary inductance acting as filter inductor, secondary full wave rectifier, and secondary shunt capacitor. The low pass filter creating a direct-current output for the CCVS class of topologies comprises secondary full or half wave rectifier, secondary filter inductor, and secondary capacitor.

It is possible due to resonance to obtain higher working voltages within elements of primary resonant circuits in VCCS topologies than those imposed by the forcing function on the inputs of these circuits. This is a preferable effect to an alternative approach of CCVS topologies that imposes higher working voltage in a secondary circuit, with respect to electrical or electrically related environmental safety of secondary circuits.

An understanding of the VCCS with full wave rectification class of topologies can become slightly more complex in the case of a resonant topology such as one referred in the literature to as an 'LLC' wherein a second inductor in shunt with the transformer primary performs an additional role, acting in shunt with the magnetizing inductance of real-world transformers, to promote in the primary circuit greater circulating current than otherwise, which causes the total primary circuit circulating current to exceed that amount necessary for supporting the required reflected load current and magnetizing current of a typical transformer's primary. As this shunt inductor along with the magnetizing inductance of the transformer primary acts in conjunction with the primary series inductance in determining the current being sourced to the transformer primary throughout the entire operational period, in a role supporting resonant behavior of the primary circuit, it forms an integral part of the band-pass filter inductance as described previously.

A resonant inductance that is series electrically connected in the primary circuit becomes a VCCS that acts upon the transformer primary. Behavior of the switches in the primary circuit along with that of the primary capacitor connected in series between the forcing function generated by the switches and the primary series inductance act to create only alternating-current voltage components on the input of the inductor. The differential voltage of the primary series inductance is clamped to the difference between the primary voltage of the transformer, and the sum of forcing function voltage plus the differential voltage of the series electrically connected capacitor. Any direct-current voltage component created by the switches is prevented by behavior of the capacitor from reaching either the primary series inductor or subsequently the transformer's primary. The voltage impressed on the transformer's primary due to the forcing function and primary resonant circuit consequently is alternating-current, and its magnitude is allowed by the voltage-compliance of the primary series inductance to be clamped through the full wave rectifier(s) of its secondary to the reflected magnitude of the power converter's output terminal voltage plus that of reflected magnitudes of forward voltage drops of the rectifier(s) and other series impedances; where voltage polarity of the transformer is in a direction determined by current flowing through it resulting from the changing current levels in the primary series resonant, primary shunt magnetizing, and any primary shunt inductances, so that due to the resulting current and voltage polarities only positive power is input to the transformer primary. Due to voltage-compliance of the transformer's secondary winding(s), and the current-compliance of the secondary circuit connected to it, the transformer output will not impose any voltage magnitude level upon the secondary circuit that exceeds the power converter's output terminal voltage magnitude by more than is necessary to overcome forward voltage drops in the forward biased rectifier and other series impedances of the secondary circuit. The maximum working voltage magnitude in the secondary circuit will therefore be clamped by the secondary rectifier(s) over the full cycle to not exceed the power converter's output terminal voltage magnitude by any significant amount, assuming the output voltage forward drop is significantly greater than the secondary rectifier forward voltage drop(s) plus that due to the influence of series electrically connected secondary impedances, resistances, or other devices.

The VCCS with half wave rectification class of topologies will be mentioned briefly at this point, as it has not been discussed earlier. Without the benefit of full wave rectification, the secondary of the transformer does not have its maximum voltage magnitude clamped to the secondary circuit voltages during the non-conducting half cycle of the rectifier(s). The maximum voltage magnitude of the secondary transformer voltage can rise therefore to its maximum compliance level, imposing this voltage on the input of the non-conducting rectifier(s) installed in the secondary circuit. An intrinsic advantage of limiting secondary maximum voltage magnitudes does not result by using the VCCS with half wave rectification class of topologies. The advantage can be regained in the case where a voltage clamp is employed to ensure the non-conducting half cycle voltage magnitude does not exceed the desired limit.

In the example given of a luminaire, it would be a practical maintenance advantage for the operator to be able to exchange that portion of the system containing only the LED subsystem without being exposed to hazardous potentials, or risk of electric shock. In the example where an operator would have access to an LED subsystem and secondary circuit that it connects to, these would be classified SELV for the purpose of addressing the requirement for electrical safety against electric shock hazard.

Based upon this framework of impedances and filters just developed to understand the relevant behavioral differences between CCVS class, VCCS with half wave rectification class of topologies, and VCCS with full wave rectification class of topologies, two examples are now given for comparison where in order to optimize for secondary circuit efficiency through means of using the highest feasible output voltage for the case of a secondary circuit that is to be classified as SELV, it must be assured through design, either inherently, by active means, or both, that working voltages in the secondary shall not exceed 42.4 Volts alternating-current or 60.0 Volts direct-current under normal conditions or single fault conditions. The alternating-current voltage peak produced by the transformer secondary is the largest magnitude of all voltages present in the secondary circuit of SM topologies considered herein since the maximum direct-current voltage magnitude does not exceed the maximum alternating-current peak voltage magnitude; so the design must limit secondary working voltages to 42.4 Volts alternating-current, which corresponds to a sinusoidal waveform with 60.0 Volts peak, on the transformer secondary for those circuits to be classified SELV.

In a first example one assumes the total forward voltage drop of all series electrically connected elements, exclusive of any inductive element, between the transformer secondary and the power converter output terminals are equal to 2.4 Volts, where an arrangement of secondary full wave current rectification elements is employed that imposes forward voltage drops of two series rectifiers at 1.2 Volts each, and where the topology to be used for power conversion is chosen from the more prevalent CCVS class of topologies; and one further assumes that a minimum duty cycle of 0.3 may occur, signifying the pulse width minimum limit is 30% of the ideal maximum full pulse width, then due to the voltage averaging effect of the CCVS's secondary inductor the load voltage in the ideal case will be the product of the duty cycle, 0.3, and the transformer secondary voltage, 60.0 Volts, minus the secondary circuit's forward voltage drops, 2.4 Volts: 15.6 Volts. This would produce secondary circuit efficiency of the output voltage, 15.6 Volts, divided by the sum of the output voltage, 15.6 Volts, and the forward voltage drops, 2.4 Volts: 0.87. An over-voltage condition could still result in the secondary circuit under a fault condition, as in one case where the mains supply voltage were to be too high, unless the higher working voltage in the secondary can be prevented by an effective fast-acting supplemental protection in the form of a circuit for over-voltage detection that acts to sense and limit secondary working voltage maximum levels.

In a second example, one assumes in the previous example that the topology to be used for power conversion is instead chosen from among the VCCS with full wave rectification class of topologies described herein, and which therefore does not include a secondary inductor capable of performing voltage averaging, and that for the purpose of illustration does include a full bridge rectifier in its secondary, and therefore that the current-compliant secondary circuit does not act by performing a voltage averaging function on the periodic waveshape resulting from the rectified transformer secondary voltage, as in the case of the CCVS class of topologies, then the load voltage will be the transformer secondary peak voltage, 60.0 Volts, minus the total forward voltage drops of 2.4 Volts: 57.6 Volts. This would produce secondary circuit efficiency equal to the output voltage, 57.6 Volts, divided by the sum of the output voltage, 57.6 Volts, and the forward voltage drops, 2.4 Volts: 0.96. This example uses the VCCS with full wave rectification class of topologies to produce secondary circuit efficiency calculated at 9% greater than that calculated in the first example using CCVS class of topologies.

Further, it is necessary in the case of the VCCS with full wave rectification class of topologies as in the CCVS class of topologies, that in order to satisfy criteria ensuring electrical safety of an SELV secondary circuit is maintained in the event of a single fault, there is a requirement that should the control over the primary malfunction, the transformer secondary voltage magnitude must be prevented from becoming higher than planned by design in the given case of an intended 57.6 Volts load voltage. A single fault in this extreme case could result in a voltage excursion of the transformer's secondary that immediately violates the maximum voltage magnitude limit, unless the higher working voltage magnitude can be prevented by an effective fast-acting supplemental form of protection in the form of a circuit for over-voltage detection that acts to sense and limit secondary working voltage levels. In practice, some design margin would be allowed that would accommodate the delay of the protection cicuit by designing for a slightly lower output voltage than the theoretical maximum.

In both the first example of CCVS class of topologies and the second example of VCCS with full wave rectification class of topologies, the criteria for SELV would necessitate an effective protection circuit that acts to sense and limit secondary working voltage levels; but the second example, due to its normally and inherently lower levels of maximum working voltage magnitudes at any given power converter output terminal voltage, continues to offer new utility of higher secondary circuit efficiency while continuing to satisfy criteria for low-voltage classification; or, more generally, having higher secondary circuit efficiency with an advantage of lower working voltage magnitudes in secondary circuits. Even if the required criteria were for ELV classification instead of SELV classification, the second example would continue to offer new utility through higher secondary circuit efficiency resulting from higher load voltage, while imposing lower secondary working voltage maximum magnitudes. By using these two topology examples for both SELV or ELV secondary circuits, one may design a load voltage in the case of the second topology example that is greater than in the case of the first topology example, but less than the maximum ideally achievable as described in the second example, so that an additional advantage resulting from the VCCS with full wave rectification class of topologies over the CCVS class of topologies is that they would have simultaneously lower working voltage magnitudes in the secondary and higher secondary circuit efficiency.

It should be understood that the application example given of an LED luminaire is for illustrative purposes, it being a relevant actual case; and using this example does not imply or intend any limits to the scope of applicability for which exists such requirements for new utility of a class of power converter topologies herein described as being VCCS with full wave rectification. It should be further understood that in the description of how efficiency is to be calculated there should be included a usually small additional current component that conducts through the rectifier but does not conduct through the output load, due to a need to generate internal bias power to satisfy requirements of secondary control circuits. This additional current component has been ignored in the interest of simplicity of illustration, and this simplification does not imply or intend to limit the scope of applicability for which exists such requirements for new utility of a power converter as herein described.

A third example simply recognizes the advantage of lower magnitude of working voltages in secondary circuits, without attempting to satisfy ELV, SELV, or other limited-voltage secondary circuit constraints. A high voltage battery charger system may be incorporated into an electric or a hybrid electric automobile, wherein power converter output terminal voltage would be at relatively high magnitude to properly charge the high voltage battery load. This imposes insulation and isolation requirements upon the design of the power converter charger in order to protect the operator from coming into contact with hazardous voltages. The high voltage power converter is more easily manufactured for a lower cost, and with greater levels of performance and safety assurance, for power converters with isolated secondaries having lower levels of working voltage magnitudes. In this example the VCCS with full wave rectification would have greatly reduced secondary working voltage magnitudes when compared with the CCVS class of topologies. Secondary circuit efficiency may also be improved to a minor degree for the high voltage power converter designed using VCCS, owing to the fact that high voltage rectifiers have typically larger forward voltage drops, and owing to the inability of low forward voltage drop Schottky diodes to be employed, so the primary resulting benefit would be in reducing cost of manufacture and reducing potential safety hazards through reduced insulation and isolation requirements, and the secondary benefit may be in improved secondary efficiency.

Finally, it is observed that a particular topology of a current-fed type along with adoption of appropriate new structural features may be well suited to applications where reduction in package size and weight would represent a benefit, such as for automotive applications, and would be especially well suited to exo-atmospheric applications where insulation and isolation requirements are even more imposing on package size and weight, and where for instance the benefit of reduction in package size and weight would be of high value.

SUMMARY OF THE INVENTION

The inventor has found that a need exists to provide working voltage magnitude values optimized at lower levels in power conversion secondary circuits to achieve benefits for power converters of reduced cost of manufacture, reduced size, improved reliability, or reduced inherent risk of safety hazard.

The inventor has also found that a need exists to provide greater secondary circuit power conversion efficiency through designing higher output load voltage magnitude values, while simultaneously promoting safety for operators through limiting working voltage magnitude values in power conversion secondary circuits to levels deemed safe for human physical contact, or to levels that would not ignite a fire or explosion in certain classified hazardous environments.

The inventor has further found that a need exists for new utility of a class of direct-current to-direct-current electrical power converters that optimally addresses simultaneously improving secondary circuit power conversion efficiency and limiting working voltage magnitude values in power conversion secondary circuits to levels deemed safe for human physical contact, or to levels that would not ignite a fire or explosion in certain classified hazardous environments.

The inventor has further yet found that a need exists for new utility of a class of direct-current to direct-current electrical power converters to increase market adoption of energy efficient systems due to more favorable TCO analysis based upon lower operating costs and lower manufactured cost; where secondary circuits have lower operating costs facilitated by higher efficiency, and the lower manufactured cost facilitated by lower working voltage magnitudes, and higher efficiency.

It is an object of this invention to provide innovative utility of a class of direct-current to direct-current power conversion topologies to achieve in secondary circuits unexpected benefits of, and due to, optimization for lower levels of working voltage magnitude values.

It is yet another object of this invention to provide innovative utility of a class of direct-current to-direct-current power conversion topologies to achieve in secondary circuits unexpected benefits of, and due to, greater power conversion efficiency and simultaneously optimizing for lower levels of working voltage magnitude values.

It is further yet another object of this invention to provide innovative utility of power conversion technology through employing a VCCS with full wave rectification class of topologies, where VCCS topologies may sometimes be referred to as current-fed, to optimize for greater power conversion efficiency through higher output load voltage magnitudes while simultaneously limiting increase to the working voltage magnitude values in secondary circuits to only small increase above the voltage magnitude of the power output terminals.

This and other objects are also achieved by providing a means to limit maximum working voltage magnitudes in secondary circuits connected to the output of an alternating-current source so they do not exceed the voltage magnitude of the power output terminals beyond that required to overcome secondary rectifier forward voltage drop(s) plus forward voltage drops due to the influence of effectively stray impedance(s), resistance(s), current monitor(s), or other device(s) series electrically connected between the input to the secondary circuit and the power output terminals, through which power converter output current must flow.

The subject invention may be implemented by series electrically connecting an inductor of appropriate inductance value in the power converter primary circuit supplying power to the input of a direct-current galvanically isolating transformer, or by incorporating inductance of appropriate value into the direct-current galvanically isolating transformer primary and secondary as leakage inductance, or both; and by not allowing any substantial amount of inductance to be series electrically connected in the secondary power circuit between the input of the secondary power circuit and its secondary capacitor, exclusive of said transformer secondary. The details of how large the value of inductance and value of primary series capacitor in the primary circuit should be are dependent on the particularities of each design such as regarding input voltage range, output power and voltage range, and specific topology chosen from among the class of VCCS with full wave rectification topologies. In the case of one such topology known as 'LLC' that was chosen for example embodiments of this invention, details can be found in a paper, publically available on the date of this filing, by Hang-Seok Choi, entitled "Application Note AN-4151, Half-bridge LLC Resonant Converter Design Using FSFR-series Fairchild Power Switch (FPS™)", published October 2007 as Revision 1.0.0 by Fairchild Semiconductor Corporation, as well as from other publically available sources. Those of ordinary skill in the art of power converter design will be able to follow and apply this application note, or other instructions available from several publically available sources.

Implementing the subject invention requires also that a full wave rectifier arrangement be electrically connected in the secondary circuit following the transformer secondary, as a means to full wave rectify the transformer secondary current. Operation of the full wave rectifier requires its conduction over the full cycle in order to clamp the voltage compliant secondary of the transformer so its voltage magnitudes do not at any time during its cycle exceed the maximum magnitude value of the voltage of the power output terminals plus said forward voltage drop(s).

Implementing the subject invention further requires that either a secondary capacitor or voltage clamp be electrically shunt connected in the secondary circuit after the full wave rectifier, or that a load be attached to the power output terminals that establishes a maximum voltage magnitude such as for the case of a load comprising either a battery, an LED, or a voltage clamp. The input impedance of the secondary circuit is required to be current-compliant, which may be aided by the placement of this capacitor, said voltage clamp, or said output load, and substantial lack of significant inductive elements in series electrical connection between the secondary of the transformer and this capacitor, said voltage clamp, or said output load. Inductive elements are significant if during the normal operation of the converter over its usual range of frequencies they produce voltage drops that are great enough that they must be considered in designing an appropriate level of load voltage that would limit the maximum working voltage magnitude to an intended value. The secondary circuit must be designed to withstand maximum working voltage magnitudes only modestly greater than the voltage magnitude of the power output terminals as necessary to also overcome secondary rectifier forward voltage drop(s) plus said forward voltage drop(s) due to the influence of series electrically connected effectively stray impedance(s), resistance(s), current monitor or other device(s) that load current must conduct through between the transformer secondary and either the secondary capacitor, said voltage clamp, or said output load.

Implementing the subject invention, in the event regulation of voltage occurs by remote voltage sense at the load terminals, also requires that impedances that power converter output current must flow through between secondary shunt capacitor, or voltage clamp, in the secondary circuit and power output terminals must be substantially non-inductive. Some implementations may install a current monitor device between the capacitor, or voltage clamp, and the output terminals, which may impose additional impedance in series between the transformer secondary and the power output terminals. It is necessary that this and other impedance(s) located between the transformer secondary and the power output terminals impose no greater than modest forward voltage drop(s), if the resulting working voltage maximum magnitudes be no more than modestly greater than the power output terminal voltage magnitude as necessary to overcome secondary rectifier forward voltage drop(s) plus forward voltage drop(s) due to the influence of series electrically connected effectively stray impedance(s), resistance(s), current monitor or other device(s) that load current must conduct through between the transformer secondary and the power output terminals.

The impedance between the power output terminals and the output load is assumed to be nil, however should it be non-zero then the relationship between the working voltage maximum magnitudes in the secondary circuit and that of the output load is that the working voltage maximum magnitude will not exceed output load voltage magnitude by more than necessary to include forward voltage drop in impedance between output terminals and power output load, in addition to previously mentioned secondary rectifier forward voltage drop(s) plus forward voltage drop(s) due to the influence of series electrically connected effectively stray impedance(s), resistance(s), current monitor or other device(s), that load current must conduct through between the transformer secondary and the output load.

Implementing the subject invention in the case of also satisfying criteria for safety protection additionally requires insulation and isolation methods and materials of nature and design that are well understood by those of ordinary skill in the art of power converter design.

Implementing the subject invention in the case of also satisfying criteria for safety protection additionally under a specified number of simultaneous fault conditions requires inclusion of fault detection and fault limit circuits of nature and design that are well understood by those of ordinary skill in the art of power converter design.

Implementing the subject invention does not require regulation of output load voltage or current, or detection of faults. Load regulation and fault detection are generally done, as in the case of example embodiments, to satisfy additional criteria beyond those for functional insulation, for redundant protection means to ensure electrical safety, or to safeguard the load.

With the implementation as described in this summary, higher output load voltages may now be regulated for SELV or ELV secondary circuits through means of this new utility employing the VCCS with full wave rectification class of topologies, than would be otherwise possible using the CCVS class of topologies, for the purpose of achieving the benefits of greater secondary circuit efficiency, smaller packaging size and weight, and lower cost of manufacture. Greater secondary circuit power conversion efficiency results through reduction to percentage of power loss, said loss including loss that occurs due to output load current conducting through the transformer's output circuit rectifier forward voltage drop(s).

With the implementation as described in this summary for any given output voltage magnitude, lower secondary circuit maximum working voltage magnitudes result through means of this new utility employing the VCCS with full wave rectification class of topologies, than would be otherwise possible with the CCVS class of topologies, for the purpose of achieving benefits of reduction in the risk of safety hazard due to secondary circuit voltage magnitude, smaller packaging size, or lower cost of manufacture.

Further scope of applicability of the present invention will become apparent from a review of the detailed description and accompanying drawings. It should be understood that the description and examples, while indicating example embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings, which are given by way of illustration only, and thus are not to be construed as limiting the scope of the present invention. In the drawings.

DETAILED DESCRIPTION OF EXAMPLE EMBODIMENTS

Figure 1:
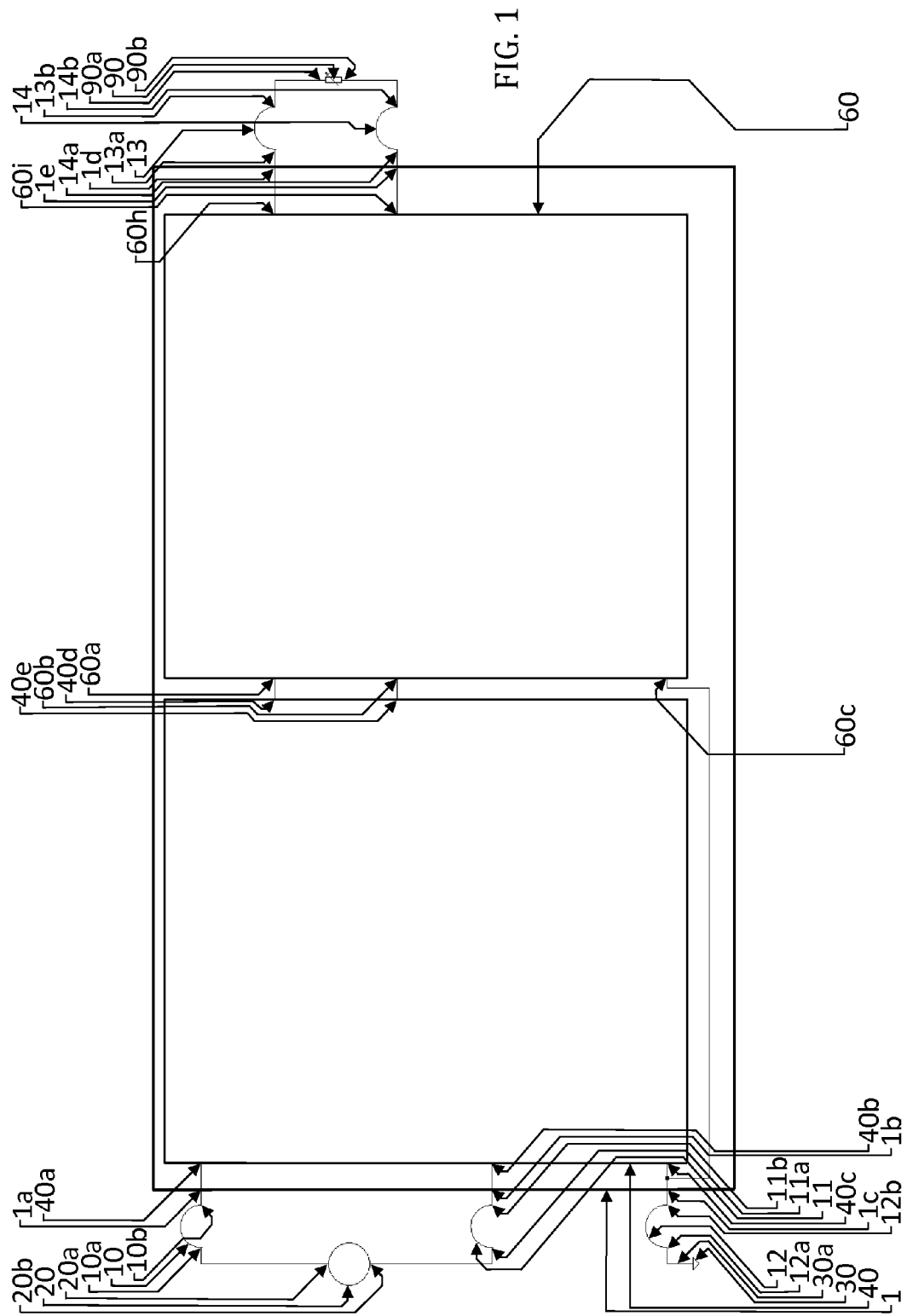
FIG. 1 shows a simplified schematic circuit diagram instructing a method for manufacturing a power converter, herein also referred to as a method for power conversion, herein also referred to as a method for limiting voltage in a power converter, according to a first embodiment of the present invention.

The following description of the example embodiments refers to a method for manufacturing a power converter, herein also referred to as a method for power conversion, herein also referred to as a method for limiting voltage in a power converter, that are useful for reducing maximum magnitude working levels of across-variable, herein also referred to as working voltage maximum magnitude, of a means of secondary source, herein also referred to as an output circuit, and including a secondary circuit. The output load, herein also referred to as an output circuit load, can be any type or combination of circuit elements capable of supporting a predetermined output voltage level.

It should be understood that the example embodiments of the power conversion circuit employ an 'LLC' topology, which provides across-variable-compliant through variable sourcing, herein also referred to as voltage-compliant current sourcing, sourcing of power input to the output circuit, and that there are several topologies available for this purpose of providing a voltage-compliant current source at the means of functional connectivity, herein also referred to as the input, to the output circuit; and that the 'LLC' topology has several possible embodiments exploiting how means of leakage energy-field coupling, herein also referred to as leakage inductance, and magnetizing inductance of the alternating-current power energy-field coupling, herein also referred to as the power transformer, may eliminate or offset a need for discrete means of energy-field coupling, herein also referred to as inductors, unlike for the present instances in the cases of the example embodiments for the sake of simplicity of illustration where series and shunt inductors are included as discrete elements and leakage and magnetizing inductances are ignored; and that no limit on the applicability of the example embodiments is intended, implied, or should be inferred due to choice of 'LLC' topology in these particular example embodiments.

It should be further understood that the example embodiments derive bias and control power for various internal supporting circuits, but that for the sake of illustrative simplicity the figures do not show the derivation or routing of bias and control power, taking advantage of an assumption that those of ordinary skill in the art of design of power converter circuits are well familiar with numerous techniques to derive bias and control power, including its provisioning of any needed direct-current through-variable galvanic isolation, herein also referred to as direct-current galvanic isolation, herein also referred to as galvanic isolation, and that no limit on the applicability of the example embodiments is intended, implied, or should be inferred due to choice of not illustrating the derivation and use of bias and control power.

It should be yet further understood that the example embodiments do not employ an intermediate primary power stage for the purpose of controlling input power factor, or for reconfiguring the primary bridge rectifier along with suitable detection and control to accommodate different mains supply voltage levels, and that there are possible embodiments that would include some or all of these features, and that no limit on the applicability of the example embodiments is intended, implied, or should be inferred due to choice of not employing an intermediate primary stage for the purpose of either reconfiguration of primary bridge rectifier or control of power factor.

FIG. 1 shows a simplified schematic circuit diagram of a power converter, herein also referred to as power converter circuit 1, to instruct a method for manufacturing a power converter, said power converter herein also referred to as power converter circuit 1, according to a first embodiment of the present invention. Power converter circuit 1 has means of functional connectivity to line input, herein also referred to as line terminal 1a; and means of functional connectivity to neutral input, herein also referred to as neutral terminal 1b; and means of functional connectivity to ground input, herein also referred to as ground terminal 1c; and means of functional connectivity to positive differential output, herein also referred to as positive differential output terminal 1d; and means of functional connectivity to negative differential output, herein also referred to negative differential output terminal 1e. Said positive differential output terminal 1d and said negative differential output terminal 1emay be referred to in the claims herein as a set, termed 'power output terminals' or equivalently 'means of functional connectivity to output of power conversion method'.

FIG. 1 also shows accessibility to means of functional connectivity, herein also referred to as terminals, for mains power and ground, and to a means of power consumption, herein also referred to as an output circuit load, herein also referred to as a load, illustrating an application.

The first embodiment shown in FIG. 1 includes access to mains power supply distribution 20 and installation facility 30. The mains power supply distribution 20 has line terminal 20a, and neutral terminal 20b. The installation facility's 30 has ground terminal 30a.

The first embodiment shown in FIG. 1 includes the application of electrically conductive cables 10, 11 and 12. Electrically conductive cable 10 has terminals 10a, 10b. Electrically conductive cable 11 has terminals 11a, 11b. Electrically conductive cable 12 has terminals 12a, 12b. Electrically conductive cable's 10 terminal 10a connects to mains power supply distribution's 20 line terminal 20a, and electrically conductive cable's 10 terminal 10b connects to power converter circuit's 1 line terminal 1a. Electrically conductive cable's 11 terminal 11a connects to mains power supply distribution's 20 neutral terminal 20b, and electrically conductive cable's 11 terminal 11b connects to power converter circuit's 1 neutral terminal 1b. Electrically conductive cable's 12 terminal 12a connects to installation facility's 30 ground terminal 30a, and electrically conductive cable's 12 terminal 12b connects to power converter circuit's 1 ground terminal 1c.

Mains power supply distribution 20 is the source of input power to the power converter circuit in this preferred embodiment. Installation facility 30 is the contact for safety earth grounding provided by the facility wherein the power converter circuit is located.

It should be understood that the preferred embodiment employs a single point of grounding at the power converter, power converter circuit's 1 ground terminal 1c, and that other possible embodiments would employ multiple points of grounding at the power converter, such as in the case of an IS power converter circuit, which employs two independent points; or there may be no points of grounding, as would be the case where grounding is not applicable, such as with independent input energy storage represented by a battery; and that no limit on the applicability of this embodiment is intended, implied, or should be inferred due to choice of a single independent point of grounding the power converter circuit.

It should be understood that the preferred embodiment employs power input from a primary mains supply that is single phase, and that there are other possible embodiments that separately or interchangeably employ power inputs that are single phase or polyphase alternating-current, non-mains inputs, or direct-current, and that no limit on the applicability of this embodiment is intended, implied, or should be inferred due to choice of either primary mains or single phase as the power input. It should be further understood that the preferred embodiment employs availability of an installation facility's 30 ground terminal 30a, and that there are other possible embodiments that do not employ a facility's 30 ground terminal 30a, or any ground terminal 30a at all, or any facility 30 at all, and that no limit on the applicability of this embodiment is intended, implied, or should be inferred due to choice of employing a facility ground terminal.

The embodiment of the present invention shown in FIG. 1 includes a means of primary power source, herein also referred to as primary power circuit 40. Primary power circuit 40 also belongs to a larger set known as a primary circuit. The primary power circuit 40 has line means of functional connectivity to its input, herein also referred to as line input terminal 40a; neutral means of functional connectivity to its input, herein also referred to as neutral input terminal 40b; ground means of functional connectivity to its input, herein also referred to as ground input terminal 40c; and means of functional connectivity to its output, herein also referred to as output terminals 40d, 40e. Primary power circuit's 40 line input terminal 40a connects to power converter circuit's 1 line terminal 1a. Primary power circuit's 40 neutral input terminal 40b connects to power converter circuit's 1 neutral terminal 1b. Primary power circuit's 40 line ground terminal 40c connects to power converter circuit's 1 ground terminal 1c.

Primary power circuit 40 obtains through-variable-compliant across variable, herein also referred to as current-compliant voltage, sourcing input power through its connections to power converter circuit's 1 line input terminal 1a and power converter circuit's 1 neutral input terminal 1b, and converts this power into the form of an across-variable-compliant AC through-variable source, herein also referred to as a voltage-compliant alternating-current current source, which it produces as primary circuit output power on means of functional connectivity, herein also referred to as output terminals of primary power circuit 40, identified in FIG. 1 as output terminals 40d, 40e. Primary power circuit 40 also obtains electrical conductivity to safety ground through connection with power converter circuit's 1 ground terminal 1c, which it may use for purpose of filtering conducted electro-magnetic emissions away from injecting onto the power supply distribution 20, shielding radiated electro-magnetic emissions to limit them from escaping the confines of an enclosure, or providing through the connection of conductive ground to an electrically conductive enclosure of circuits one level of protection to an operator from electric shock due to the influence of hazardous voltages on the primary circuit.

The first embodiment shown in FIG. 1 includes a means of secondary power source, herein also referred to as an output circuit, herein also referred to as secondary power circuit 60, following the primary power circuit 40. Secondary power circuit 60 also belongs to a larger set known as a secondary circuit. The secondary power circuit 60 has means of functional connectivity to inputs, herein also referred to as power input terminals 60a, 60b; means of functional connectivity to ground input, herein also referred to as ground input terminal 60c; means of functional connectivity to positive differential output, herein also referred to as positive differential output terminal 60h; and means of functional connectivity to negative differential output, herein also referred to as negative differential output terminal 60i. Secondary power circuit's 60 input terminal 60a is connected to primary power circuit's 40 output terminal 40d; secondary power circuit's 60 input terminal 60b is connected to primary power circuit's 40 output terminal 40e; secondary power circuit's 60 input ground terminal 60c is connected to power converter circuit's 1 ground terminal 1c and primary power circuit's 40 line ground terminal 40c. Said Secondary power circuit's 60 input terminal 60a and said secondary power circuit's 60 input terminal 60b are referred to in the claims herein being designated as a set, termed secondary circuit input terminals, or termed equivalently as means of functional conectiveity to means of secondary power source input. Secondary power circuit's 60 positive differential output terminal 60h is connected to power converter circuit's 1 positive differential output terminal 1d; secondary power circuit's 60 negative differential output terminal 60i is connected to power converter circuit's 1 negative differential output terminal 1e. Said secondary power circuit's 60 positive differential output terminal 60h and said secondary power circuit's 60 negative differential output terminal 60i are referred to in the claims herein being designated as a set, termed 'secondary circuit output terminals' or equivalently 'means of functional connectivity to means of secondary power source output'.

Secondary power circuit 60 presents through-variable-compliant, herein also referred to as current-compliant, input impedance on its input terminals 60a, 60b. Secondary power circuit 60 obtains input power from a voltage-compliant current source through its input terminals 60a, 60b, which power is provided by the primary power circuit's 40 output terminals 40d, 40e, and conditions this power into the form of a current-compliant voltage source that it produces as output on secondary power circuit's 60 output terminals 60h, 60i. Secondary power circuit 60 also obtains means of functional connection, herein also referred to as electrical conductivity, to safety ground at installation facility's 30 ground terminal 30a through connection with power converter circuit's 1 ground terminal 1c.

It should be understood that the first embodiment includes one primary power circuit 40, and one secondary power circuit 60, yet another embodiment may include several primary power circuits operating simultaneously either in parallel, series, or series-parallel, in place of one primary power circuit 40; and yet another embodiment may include several secondary power circuits operating simultaneously either in parallel, series, or series-parallel, in place of one secondary power circuit 60; or that yet still another embodiment may include any combination of multiples of the herein described variations of primary power circuits to the herein described variations of secondary power circuits, or the herein described variations of secondary power circuits to the herein described variations of primary power circuits; or the division between primary power circuit 40 and secondary power circuit 60 may be eliminated where only one power stage is considered with respect to differentiating properties of primary verses secondary, and input verses output circuits, such as for systems where mains power is not used, or where power flow may be bidirectional, respectively; all these variations of divisions between primary power circuit 40 and secondary power circuit 60 being possible to embody the full power converter circuit 1, so that no limitation to the applicability of the invention is intended or implied by the choice of a using one primary power circuit 40 as input circuit, and one secondary power circuit 60 as output circuit to embody the full power converter circuit 1.

The first embodiment shown in FIG. 1 includes electrically conductive cables 13, and 14. Electrically conductive cable 13 has terminals 13a, 13b. Electrically conductive cable 14 has terminals 14a, 14b. Electrically conductive cable's 13 terminal 13a connects to power converter circuit's 1 positive differential output terminal 1d. Electrically conductive cable's 14 terminal 14a connects to power converter circuit's 1 negative differential output terminal 1e.

The first embodiment shown in FIG. 1 includes the application of a means of power consumption, herein also referred to as an output circuit load, herein also referred to as output load 90, which is connected to electrically conductive cables 13, and 14. During operation, Output load 90 has an output circuit load current passing through it and a output circuit load voltage across it, Output load 90 has means of functional connectivity to positive differential across-variable means of power consumption, herein also referred to as positive differential load terminal 90a, and means of functional connectivity to negative differential across-variable means of power consumption, herein also referred to as negative differential load terminal 90b. Output load's 90 positive differential load terminal 90a is connected to electrically conductive cable's 13 terminal 13b; output load's 90 negative differential load terminal 90b is connected to electrically conductive cable's 14 terminal 14b.

It should be understood that the first embodiment includes electrically conductive cables 13, 14 connected to power converter circuit's 1 positive differential output terminal 1d, and power converter circuit's 1 negative differential output terminal 1e, respectively, said electrically conductive cables 13, 14 being used to connect power converter circuit's 1 positive differential output terminal 1d, and power converter circuit's 1 negative differential output terminal 1e to output load's 90 positive differential load terminal 90a, and negative differential load terminal 90b, respectively, yet another embodiment may not require use of electrically conductive cables 13, 14, instead directly connecting power converter circuit's 1 positive differential output terminal 1d, and power converter circuit's 1 negative differential output terminal 1e to output load's 90 positive differential load terminal 90a, and negative differential load terminal 90b, respectively; so that no limitation to the applicability of the invention is intended or implied by the choice of using electrically conductive cables 13, 14 connected to power converter circuit's 1 positive differential output terminal 1d, and power converter circuit's 1 negative differential output terminal 1e, respectively, instead of direct connection between output load's 90 positive differential load terminal 90a, and negative differential load terminal 90b with power converter circuit's 1 positive differential output terminal 1d, and power converter circuit's 1 negative differential output terminal 1e, respectively.

It should be further understood that the first embodiment identifies the load as output load 90, which it indicates to be separate from power converter circuit 1; and that another embodiment may instead include the output load 90 within power converter circuit 1, where power converter circuit's 1 positive differential output terminal 1d, and power converter circuit's 1 negative differential output terminal 1e would not be necessary, so that no limitation to the applicability of the invention is intended or implied by the choice of identifying the load as being separate from power converter circuit 1.

It should be yet further understood that the first embodiment identifies the load as output load 90 that has a preferred polarity, and that another embodiment may instead include a load that does not have a preferred polarity, so that no limitation to the applicability of the invention is intended or implied by the choice of output load 90 having a preferred polarity, where said polarity is with respect to the across-variable, herein also referred to as being with respect to voltage.

Figure 2:
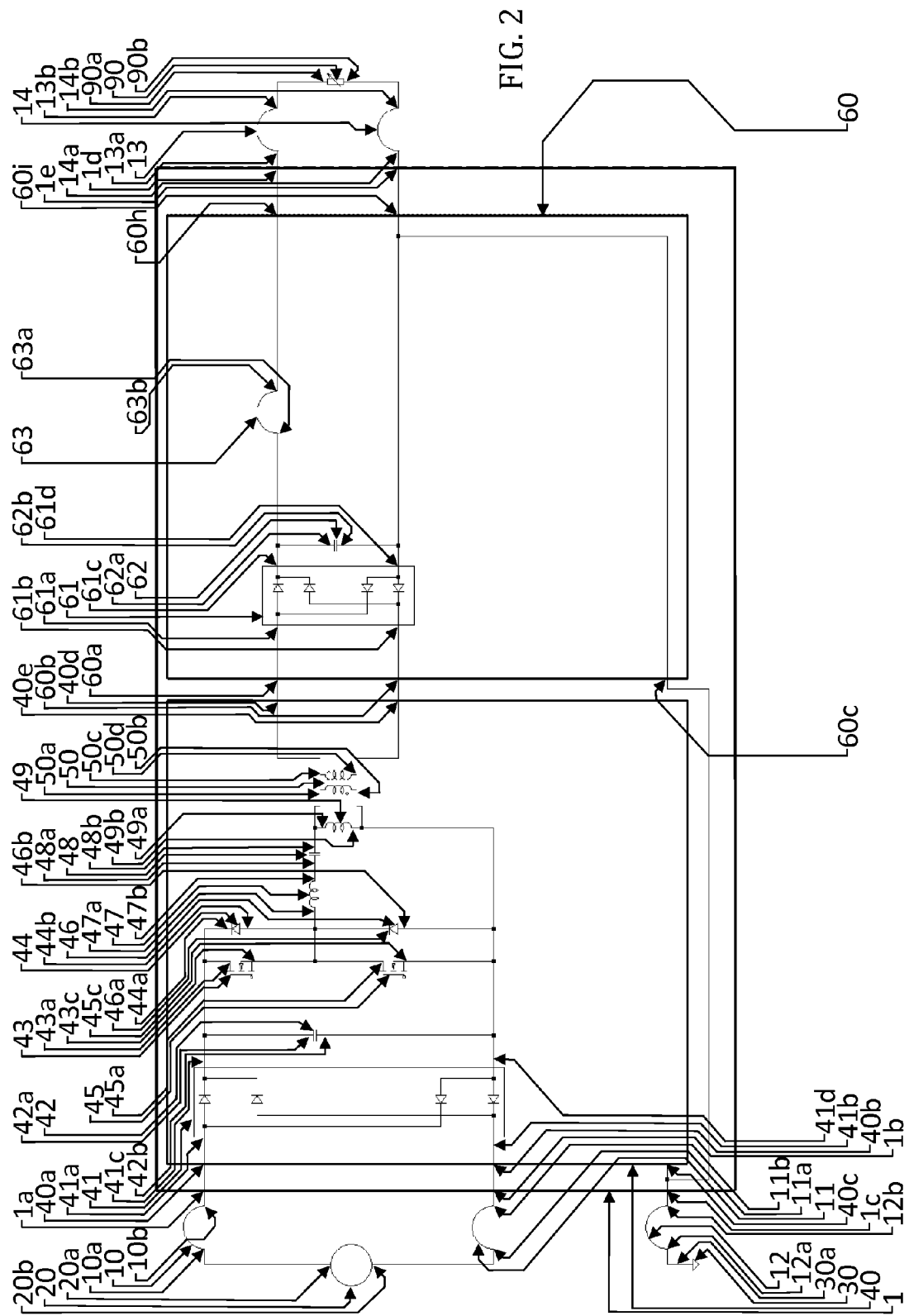
FIG. 2, which is a continuation of FIG. 1, shows additional details for implementing the first embodiment that relate to the conversion circuit's plant function.

FIG. 2, which is a continuation of FIG. 1, shows additional details that relate to the power converter circuit's plant function, as it is referred to in system engineering terminology, for implementing the first embodiment.

The embodiment shown in FIG. 2 includes a means of through-variable rectification, herein also referred to as primary rectifier 41, connected within the primary power circuit 40. The primary rectifier 41 has primary alternating-current input terminals 41a, 41b, positive differential output terminal 41c, and negative differential output terminal 41d. Primary rectifier 41 has its AC 41a connected to primary power circuit's 40 line input terminal 40a, and its alternating-current input 41b connected to a primary power circuit's 40 neutral terminal 40b.

Full bridge rectifier 41 accepts alternating-current voltage and alternating-current current on its primary alternating-current input terminals 41a, 41b, and allows conduction such that currents flow in a positive direction from its positive differential output terminal 41c, and currents flow in a positive direction into its negative differential output terminal 41c.

The first embodiment shown in FIG. 2 includes a means of energy storage, said means of energy storage herein also referred to as primary bulk capacitor 42, connected within the primary power circuit 40. The primary bulk capacitor 42 has positive differential terminal 42a, and negative differential terminal 42b. The primary bulk capacitor 42 has its positive differential terminal 42a connected to primary rectifier's 41 positive differential output terminal 41c, its negative differential terminal 42b connected to the full bridge rectifier's 41 negative differential output terminal 41d.

Primary bulk capacitor 42 stores energy including that received from mains power supply distribution 20 through primary power circuit 40 line input terminal 40a, neutral input terminal 40b, by way of primary rectifier 41 positive differential output terminal 41c, and negative differential output terminal 41d. In storing energy primary bulk capacitor 42 produces an across-variable, herein also referred to as a voltage, on its positive differential terminal 42a that is positive with respect to its negative differential terminal 42b. Voltage on primary bulk capacitor 42 is nearly direct-current due to primary rectifier 41 reestablishing it twice per line cycle at a level near the peak value of the voltage magnitude on mains power supply distribution 20 line terminal 20a with respect to neutral terminal 20b.

The first embodiment shown in FIG. 2 includes a means effectively of direct-current-to-alternating-current power conversion, herein also referred to as a direct-current-to-alternating-current power converter circuit, comprising two means of through-variable switching, herein also referred to as switching devices, and incorporating the functions of two means of anti-parallel through-variable rectification, herein also referred to as two anti-parallel diodes; said switching devices herein also referred to as MOSFET switching device one 43 and MOSFET switching device two 45; said two anti-parallel diodes herein also referred to as anti-parallel diode one 44 and anti-parallel diode two 46. MOSFET switching device one 43 is connected within the primary power circuit 40. MOSFET switching device one 43 has drain terminal 43a, and source terminal 43c. MOSFET switching device one 43 has its drain terminal 43a connected to primary bulk capacitor's 42 positive differential terminal 42a, and primary rectifier's 41 positive differential output terminal 41c. Anti-parallel diode one 44 is connected within the primary power circuit 40. Anti-parallel diode one 44 has cathode terminal 44a, and anode terminal 44b. Anti-parallel diode one 44 has its cathode terminal 44a connected to MOSFET switching device one's 43 drain terminal 43a, primary bulk capacitor's 42 positive differential terminal 42a, and primary rectifier's 41 positive differential output terminal 41c. Anti-parallel diode one 44 has its anode terminal 44b connected to MOSFET switching device one's 43 source terminal 43c. MOSFET switching device two 45 is connected within the primary power circuit 40. MOSFET switching device two 45 has drain terminal 45a, and source terminal 45c. Source terminal 45c is also herein referred to as alternating-current return terminal. MOSFET switching device two 45 has its drain terminal 45a connected to MOSFET switching device one's 43 source terminal 43c, and anti-parallel diode one's 44 anode terminal 44b. The point of connection between drain terminal 45a and source terminal 43c is herein also referred to as the alternating-current source terminal. MOSFET switching device two 45 has its source terminal 45c connected to primary bulk capacitor's 42 negative differential terminal 42b, and primary rectifier's 41 negative differential output terminal 41d. Anti-parallel diode two 46 is connected within the primary power circuit 40. Anti-parallel diode two 46 has cathode terminal 46a, and anode terminal 46b. Anti-parallel diode two 46 has its cathode terminal 46a connected to MOSFET switching device two's 45 drain terminal 45a, MOSFET switching device one's 43 source terminal 43c, and anti-parallel diode one's 44 anode terminal 44b. Anti-parallel diode two 46 has its anode terminal 46b connected to MOSFET switching device two's 45 source terminal 45c, primary bulk capacitor's 42 negative differential terminal 42b, and primary rectifier's 41 negative differential output terminal 41d.

MOSFET switching device one 43 and MOSFET switching device two 45 each cycle their switching operations periodically, so that each persists in its on-state for almost half the cycle period, with the balance of the cycle spent in the off-state. MOSFET switching device one 43 and MOSFET switching device two 45 operate 180 degrees out of phase from each other, so that only one is in an on-state at any given time. By this operation, and through connection of MOSFET switching device one's 43 drain terminal 43a to primary bulk capacitor's 42 positive differential terminal 42a, and connection of MOSFET switching device two's 45 source terminal 45c to primary bulk capacitor's 42 negative differential terminal 42b, a differential voltage on MOSFET switching device two's 45 drain terminal 45a with respect to source terminal 45c persists for almost 50% of each cycle period, alternating with nearly no differential voltage being present for the balance of the cycle period, on MOSFET switching device one's 43 source terminal 43c and MOSFET switching device two's 45 drain terminal 45a. For the sake of simplicity of this illustration, forward voltage drops during conduction are considered each to be zero across anti-parallel diode one's 44 anode terminal 44b with respect to its cathode terminal 44a, across anti-parallel diode two's 46 anode terminal 46b with respect to its cathode terminal 46a, across MOSFET switching device one's 43 drain terminal 43a with respect to its source terminal 43c, and across MOSFET switching device two's 45 drain terminal 45a with respect to its source terminal 45c.

It should be understood that other embodiments of this invention may employ switching devices from among several technologies, including BJT, MOSFET, IGBT, SiC JFET, and others, and in the first embodiment, which uses MOSFET technology devices for MOSFET switching device one 43 and MOSFET switching device two 45, may be constructed to use another technology switching device, so that no limit on the applicability of this embodiment is intended, implied, or should be inferred due to choice of MOSFET switching device one 43 and MOSFET switching device two 45 in the first embodiment. It should be further understood that other embodiments of this invention may omit anti-parallel diode one 44 and anti-parallel diode two 46, where it may be chosen instead in those embodiments to use a parasitic anti-parallel diode in each switching device, for those technology switching devices having suitable parasitic anti-parallel diodes, so that no limit on the applicability of this embodiment is intended, implied, or should be inferred due to use of anti-parallel diode one 44 and anti-parallel diode two 46 devices in the first embodiment.

The first embodiment shown in FIG. 2 includes a means of primary source energy-field coupling, said means of primary source energy-field coupling herein also referred to in situ as primary series inductance 47, herein also referred to as the primary inductance, and embodying the predetermined effective-cumulative series inductance value, said primary series inductance 47 being functionally connected within the primary power circuit 40. Primary series inductance 47 has terminals 47a, 47b. Primary series inductance 47 has its terminal 47a, herein also referred to as the operative input means, connected to anti-parallel diode two's 46 cathode terminal 46a, MOSFET switching device two's 45 drain terminal 45a, anti-parallel diode one's 44 anode terminal 44b, and MOSFET switching device one's 43 source terminal 43c.

The first embodiment shown in FIG. 2 includes a primary series capacitor 48 connected within the primary power circuit 40. Primary series capacitor 48 has terminals 48a, 48b. Primary series capacitor 48 has its terminal 48a connected to primary series inductance's 47 terminal 47b, herein also referred to as the operative output means.

This embodiment further includes an alternating-current current-compliant voltage source comprising the direct-current-to-alternating-current power conversion circuit acting in combination with equivalent series connection of primary series capacitor 48.

This embodiment further yet includes an alternating-current voltage-compliant current source comprising the alternating-current current-compliant voltage source acting in combination with primary series inductance 47.

The first embodiment shown in FIG. 2 includes a shunt inductor 49 connected within the primary power circuit 40. Shunt inductor 49 has terminals 49a, 49b. Shunt inductor 49 has its terminal 49a connected to primary series capacitor's 48 terminal 48b. Shunt inductor 49 has its terminal 49b connected to anti-parallel diode two's 46 anode terminal 46b, MOSFET switching device two's 45 source terminal 45c, primary bulk capacitor's 42 negative terminal 42b, and primary rectifier's 41 negative differential output terminal 41d.

The first embodiment shown in FIG. 2 includes a means of alternating-current power energy-field coupling, herein also referred to as power transformer 50 connected within primary power circuit 40. Power transformer 50 has insulation system comprising double insulation that is sufficient to provide safety protection against risk of electric shock, due to hazardous voltage on its primary, to an operator who comes into contact with bare conductors on its secondary. Power transformer 50 has means of functional connectivity to means of alternating-current coupler energy-field primary coupling, herein also referred to as primary terminals 50a, 50b, and means of functional connectivity to Means of alternating-current coupler energy-field secondary coupling, herein also referred to as secondary terminals 50c, 50d. Power transformer 50 has its primary terminal 50a, herein also referred to as primary input terminal, connected to shunt inductor's 49 terminal 49a, and primary series apacitor's 48 terminal 48b. Power transformer 50 has its primary terminal 50b, herein also referred to as primary return terminal, connected to shunt inductor's 49 terminal 49b, anti-parallel diode two's 46 anode terminal 46b, MOSFET switching device two's 45 source terminal 45c, primary bulk capacitor's 42 negative terminal 42b, and primary rectifier's 41 negative differential output terminal 41d. Power transformer 50 has its secondary terminal 50c connected to primary power circuit's 40 output terminal output terminal 40d. Power transformer 50 has its secondary terminal 50d connected to primary power circuit's 40 output terminal output terminal 40e.

It should be understood that the first embodiment employs power transformer 50 with insulation construction providing safety protection against electrical shock due to hazardous voltages on its primary, in the event an operator makes physical contact with bare conductive elements of its secondary, said insulation construction classified as double insulation, which satisfies one criterion for SELV classification of the secondary circuit that its secondary terminals are connected to, and that other embodiments may employ power transformer 50 with greater or lesser levels of insulation, or none at all except for functional insulation, and that no limit on the applicability of this embodiment is intended, implied, or should be inferred due to choice of power transformer's 50 insulation construction and characteristics.

Power transformer 50 receives power supplied to its primary terminals 50a, 50b by a voltage-compliant current source comprising primary series inductance 47, primary series capacitor 48, and shunt inductor 49. Power transformer 50 transforms power received on its primary terminals 50a, 50b into power that it delivers to a load connected to its secondary terminals 50c, 50d. Power transformer 50 delivers power to its secondary terminals 50c, 50d, which are connected through primary power circuit's 40 output terminals 40*d*, 40*e*, respectively, to current-compliant input impedance of the secondary power circuit's 60 power input terminals 60*a*, 60*b*, respectively.

Power transformer's 50 primary terminal 50*a* receives into it the sum of positive currents sourcing from shunt inductor's 49 terminal 49*a*, and primary series capacitor's 48 terminal 48*b*, such that transformer's 50 primary terminal 50*a* is caused to have a differential voltage that is positive with respect to its voltage on primary terminal 50*b*, in an amount as determined by reflection of power transformer's 50 secondary differential voltage on its secondary terminal 50*c* with respect to its secondary terminal 50*d*, to its primary terminals 50*a*, 50*b*. Also, the sum of positive currents sourcing into shunt inductor's 49 terminal 49*a*, and primary series capacitor's 48 terminal 4*b*, conducts out of power transformer's 50 primary terminal 50*a*, such that primary terminal 50*a* is caused to have a differential voltage that is negative with respect to its voltage on primary terminal 50*b*, in an amount as determined by reflection of power transformer's 50 secondary differential voltage on its secondary terminal 50*c* with respect to its secondary terminal 50*d*. If direction of positive current out of shunt inductor's 49 terminal 49*a* and out of primary series capacitor's 48 terminal 48*b* differ as to polarity, then any resulting net positive current out of shunt inductor's 49 terminal 49*a* and out of primary series capacitor's 48 terminal 48*b* will conduct as positive current into power transformer's 50 primary terminal 50*a*, and that terminal is caused to have a differential voltage that is positive with respect to its voltage on primary terminal 50*b*, in an amount determined by reflection of power transformer's 50 differential voltage on its secondary terminal 50*c* with respect to its secondary terminal 50*d*, so that power is transferred into the power transformer's 50 primary terminals 50*a*, 50*b*; or, a resulting net positive current into shunt inductor's 49 terminal 49*a* and into primary series capacitor's 48 terminal 48*b* will conduct as positive current out of power transformer's 50 primary terminal 50*a*, and that terminal is caused to have a differential voltage that is negative with respect to its voltage on primary terminal 50*b*, in an amount determined by reflection of power transformer's 50 secondary differential voltage on its secondary terminals 50*c* with respect to voltage on its secondary terminal 50*d*, so that power is transferred into the power transformer's 50 primary terminals 50*a*, 50*b*.

The resonant circuit comprising primary series inductance 47, primary series capacitor 48, and shunt inductor 49 has a maximum magnitude differential voltage limit of voltage-compliance it can supply across shunt inductor's 49 terminals 49*a*, 49*b*, as a function of the characteristics of resonant circuit comprising primary series inductance 47, primary series capacitor 48, and shunt inductor 49, the operating frequency of switching by MOSFET switching device one 43 and MOSFET switching device two 45, the differential voltage of primary bulk capacitor's 42 positive differential terminal 42*a* with respect to negative differential terminal 42*b*, and the loading due to power transformer's 50 primary terminals 50*a*, 50*b*. Power transformation performed by power transformer 50 establishes the maximum limit of voltage-compliance of differential voltage across its secondary terminals 50*c*, 50*d* by a fixed ratio to the maximum limit voltage-compliance of differential voltage across its primary terminals 50*a*, 50*b* due to the maximum limit of voltage-compliance of differential voltage across shunt inductor's 49 terminals 49*a*, 49*b*, and the turns ratio of number of secondary winding turns to number of primary winding turns of power transformer 50.

Power transformer's 50 secondary terminals 50*c*, 50*d* source current to the secondary power circuit 60, which is reflected net current of that conducting through power transformer's 50 primary terminals 50*a*, 50*b* sourced from within the primary power circuit 40; and power transformer 50 has differential voltage on its secondary terminal 50*c*, with respect to that on its secondary terminal 50*d*, so that polarity is in a direction consistent with current direction through secondary terminal 50*c* so that as a result only positive power is sourced.

It should be understood that the first embodiment for the purpose of illustrative simplicity employs a power transformer 50 that for all practical purposes of the first embodiment is treated as being ideal; and that magnetizing inductance associated with another variant of power transformer 50 shall be considered to have its effect included in that of shunt inductor 49 of the first embodiment for the purpose of ease of description, so that the combined effects of magnetizing inductance and shunt inductor 49 can be considered as being represented through the effect of shunt inductor 49 acting alone, but with an analytically reduced in situ inductance value than the discrete shunt inductor 49 possesses; and that the means of leakage energy-field coupling of alternating-current coupler energy-field primary coupling, herein also referred to as primary leakage inductance, and the means of leakage energy-field coupling of alternating-current coupler energy-field secondary coupling, herein also referred to as secondary leakage inductance, associated with a second variant of power transformer 50, shall be considered to have its effect included in that of primary series inductance 47 of the first transformer variant, so that the combined effects of primary leakage inductance and secondary leakage inductance analytically reflected to the primary terminals and primary series inductance 47 can be considered as being represented schematically by primary series inductance 47 in situ for the purpose of ease of description, but with an analytically increased in situ equivalent inductance value that is greater than discrete primary series inductance 47 alone possesses. This equivalent in situ inductance represented by primary series inductance 47, herein also referred to as the primary inductance, embodies the predetermined effective-cumulative series inductance value; and the discrete primary series inductance 47 when removed from the circuit is herein also referred to as the primary series inductor. The in situ primary series inductance 47 also schematically embodies the primary series stray inductance which is parasitic to any actual circuit, not being indicated discretely on the schematic diagram of an ideal circuit due to its normally inconsequential importance. In the second transformer variant of power transformer 50, magnetizing inductance could be designed to achieve a predetermined value in order to eliminate and replace shunt inductor 49; and effective leakage inductance as seen through power transformer's 50 primary terminals 50*a*, 50*b* could be designed to achieve a predetermined value in order that means of leakage energy-field coupling of alternating-current coupler energy-field secondary coupling, herein also referred to as leakage inductance of secondary winding of power transformer 50, seen across secondary terminals 50*c*, 50*d*, analytically reflected to power transformer's 50 primary terminals 50*a*, 50b, together with means of leakage energy-field coupling of alternating-current coupler energy-field primary coupling, herein also referred to as leakage inductance of primary winding of power transformer's 50, as seen across primary terminals 50*a*, 50*b*, eliminate and replace discrete primary series inductance 47, and terminals connecting to primary series inductance's 47 terminal 47*a* would instead connect directly with terminals otherwise connecting to primary series inductance's 47 terminal 47*b*. In practice, if the second transformer variant as described is not wholly achieved through design, then what values of magnetizing and leakage inductances that are achieved are supplemented with additional discrete elements of primary series inductance 47, and shunt inductor 49. No limitation of applicability of this description is intended or implied due to the simplifying assumption that power transformer 50 in its first variant is ideal.

It should be further understood that the first embodiment employs a power transformer 50 that has a single primary winding and a single secondary winding, and another embodiment may choose instead to employ a power transformer 50 that has either multiple primary windings, or multiple secondary windings, or both, and that no limitation of applicability of this description is intended or implied due to the simplifying assumption power transformer 50 having a single primary winding and a single secondary winding in the first embodiment.

The first embodiment shown in FIG. 2 includes a means of secondary full wave through-variable rectification, herein also referred to as secondary full wave current rectification 61, functionally connected within the secondary power circuit 60. The secondary full wave current rectification 61, herein also referred to as rectification means, has secondary alternating-current input terminals 61a, 61b, herein also referred to as rectification input terminals, positive differential output terminal 61c and negative differential output terminal 61d, herein also referred to as rectification output terminals. Secondary full wave current rectification 61 has its alternating-current input 61a connected to secondary power circuit's 60 input terminal 60a, and its alternating-current input 61b connected to secondary power circuit's 60 input terminal 60b. Secondary full wave current rectification 61 has its negative differential output terminal 61d connected to secondary power circuit's 60 ground input terminal 60c.

Anti-parallel diode one 44 allows energy to return to primary bulk capacitor 42 from the resonant circuit comprising primary series inductance 47, primary series capacitor 48, and shunt inductor 49, by conducting current to primary bulk capacitor's 42 positive differential terminal 42a. Anti-parallel diode one 44 may conduct current in a free-wheeling mode during limited conduction zones that occur when both MOSFET switching device one 43 and MOSFET switching device two 45 are simultaneously in off-states, allowing forward voltage bias to exist across anti-parallel diode one 44 so that anti-parallel diode one 44 anode terminal 44b is positive with respect to cathode terminal 44a, when current flow requires this conductive path to satisfy the continuous flow characteristic of the current sourcing behavior of resonant circuit comprising primary series inductance 47, primary series capacitor 48, and shunt inductor 49. Anti-parallel diode two 46 will operate in a free-wheeling mode during limited conduction zones that occur when both MOSFET switching device one 43 and MOSFET switching device two 45 are simultaneously in off-states, allowing forward voltage bias to exist across anti-parallel diode two 46 so that anti-parallel diode two 46 anode terminal 46b is positive with respect to cathode terminal 46a, when current flow requires this conductive path to satisfy the continuous flow characteristic of the current sourcing behavior of resonant circuit comprising primary series inductance 47, primary series capacitor 48, and shunt inductor 49.

The free-wheeling behaviors of anti-parallel diode one 44 and anti-parallel diode two 46 due to current sourcing behavior of the circuit comprising primary series inductance 47, primary series capacitor 48, and shunt inductor 49 allows for sequencing the switching from off-state to on-state of MOSFET switching device one 43 and MOSFET switching device two 45 to occur when there is nearly zero differential voltage across MOSFET switching device one's 43 drain terminal 43a with respect to its source terminal 43c, and across MOSFET switching device two's 45 drain terminal 45a with respect to its source terminal 45c. This sequencing technique taking advantage of the efficient nature of resonant switching is referred to as zero-voltage switching, or ZVS, which eliminates to a major degree the power dissipation losses that would occur during switching due to otherwise resistively discharging the energy stored in parasitic capacitances of MOSFET switching device one 43 and MOSFET switching device two 45.

The embodiment of the present invention shown in FIG. 2 includes a means of secondary full wave through-variable rectification, herein also referred to as secondary full wave current rectification elements 61, functionally connected within the secondary power circuit 60. The secondary full wave current rectification elements 61 has secondary AC input terminals 61a, 61b, positive differential output terminal 61c, and negative differential output terminal 61d. Secondary full wave current rectification elements 61 has its AC input 61a connected to secondary power circuit's 60 input terminal 60a, and its AC input 61b connected to secondary power circuit's 60 input terminal 60b. Secondary full wave current rectification elements 61 has its negative differential output terminal 61d connected to secondary power circuit's 60 ground input terminal 60c.

Secondary full wave current rectification 61 receives on its alternating-current input terminals 61a, 61b input power from power transformer's 50 secondary terminals 50c, 50d via connections through secondary power circuit's 60 input terminals 60a, 60b, respectively, and secondary power circuit's 60 input terminals 60a, 60b connections with primary power circuit's 40 output terminals 40d, 40e, respectively. Secondary full wave current rectification 61 allows conduction such that all currents flow in a positive direction from its positive differential output terminal 61c, and all currents flow in a positive direction into its negative differential output terminal 61c.

It should be understood that the first embodiment employs diodes in the arrangement of a full bridge in secondary full wave current rectification 61 for the purpose of secondary rectification, and that other embodiments my choose alternative arrangements for this purpose of full wave rectifying a bipolar current into unipolar current, and that no limit on the applicability of this embodiment is intended, implied, or should be inferred due to choice of diodes in the arrangement of a full bridge in secondary full wave current rectification 61.

It should be further understood that in the first embodiment secondary full wave current rectification 61 has its negative differential output terminal 61d connected to secondary power circuit's 60 ground input terminal 60c, thereby establishing a reference voltage at ground potential against which differential circuit voltages may also be determined in terms of their absolute voltages, and that in other embodiments the reference voltage may be chosen to be other than ground, or there may be no reference voltage chosen within the secondary power circuit 60 or the power converter circuit 1, and that no limit on the applicability of this embodiment is intended, implied, or should be inferred due to choice of ground as a reference voltage within secondary power circuit 60.

It should be yet further understood that the first embodiment employs diodes in secondary full wave current rectification 61 for the purpose of secondary rectification, and that in other embodiments there are enhancements and alternatives for this purpose, such as synchronous rectification that may employ a MOSFET connected anti-parallel with each diode, or a MOSFET alone in place of each diode and that may or may not utilize each MOSFET's intrinsic diode, and that no limit on the applicability of this embodiment is intended, implied, or should be inferred due to choice of diodes as rectifiers in secondary full wave current rectification elements 61.

The first embodiment shown in FIG. 2 includes a means of secondary energy storage, herein also referred to as a secondary capacitor 62 connected within the secondary power circuit 60. The secondary capacitor 62 has positive differential terminal 62a, and negative differential terminal 62b. Secondary capacitor 62 has its positive differential terminal 62a connected to secondary full wave current rectification's 61 positive differential output terminal 61c. Secondary capacitor 62 has its negative differential terminal 62b connected to secondary power circuit's 60 ground input terminal 60c, secondary full wave current rectification elements' 61 negative differential output terminal 61d, and secondary power circuit's 60 negative differential output terminal 60i.

Secondary capacitor 62 stores energy including that received from secondary power circuit's 60 input terminals 60a, 60b, delivered through secondary full wave current rectification's 61 positive differential output terminal 61c and negative differential output terminal 61d. In storing energy, secondary capacitor 62 produces a differential voltage on its positive differential terminal 62a that is positive with respect to its negative differential terminal 62b. Differential voltage on secondary capacitor 62 is nearly direct-current due to secondary full wave current rectification 61 reestablishing it twice per working cycle at a level near the peak value of the voltage magnitude on secondary power circuit's 60 power input terminal 60a respect to secondary power circuit's 60 power input terminal 60b.

Secondary capacitor 62 has impedance that is current-compliant and this helps serve the requirement that the input impedance of secondary power circuit 60 is current-compliant. In the absence of secondary capacitor 62 the input impedance of the secondary power circuit 60 would be more dependent on that of other elements connected in the secondary power circuit 60. Secondary capacitor 62 also provides storage of energy in the secondary power circuit that may source power as a current-compliant voltage source.

Certain processes served in other embodiments by a secondary power circuit may require instead having output load power in the form of a voltage-compliant current source, such as for an electric arc metal welding process or a battery charger, and those other embodiments may eliminate secondary capacitor 62 as a source of significant capacitance in the secondary power circuit 60, or may replace it instead with a voltage clamp or other means as may be necessary to limit maximum magnitude of voltage-compliance. It should be understood that the first embodiment produces output power in the form of a current-compliant voltage source, yet another embodiment can produce on its output instead a voltage-compliant current source where the maximum voltage-compliance level may be limited by design to s predetermined level, so that no limitation to the applicability of the invention is intended or implied by the choice of a secondary power circuit output that is a current-compliant voltage source in the first embodiment. It should be further understood that the first embodiment employs secondary capacitor 62, and that other embodiments may omit use of a secondary capacitor, and that no limit on the applicability of this embodiment is intended, implied, or should be inferred due to use of secondary capacitor 62.

The first embodiment shown in FIG. 2 includes an electrically conductive cable 63 connected within the secondary power circuit 60. The electrically conductive cable 63 has terminals 63a, 63b. The electrically conductive cable 63 has its terminal 63a connected to secondary full wave current rectification elements' 61 positive differential output terminal 61c, and secondary capacitor's 62 positive differential terminal 62a. The electrically conductive cable 63 has its terminal 63b connected to secondary power circuit's 60 positive differential output terminal 60h.

Figure 3:
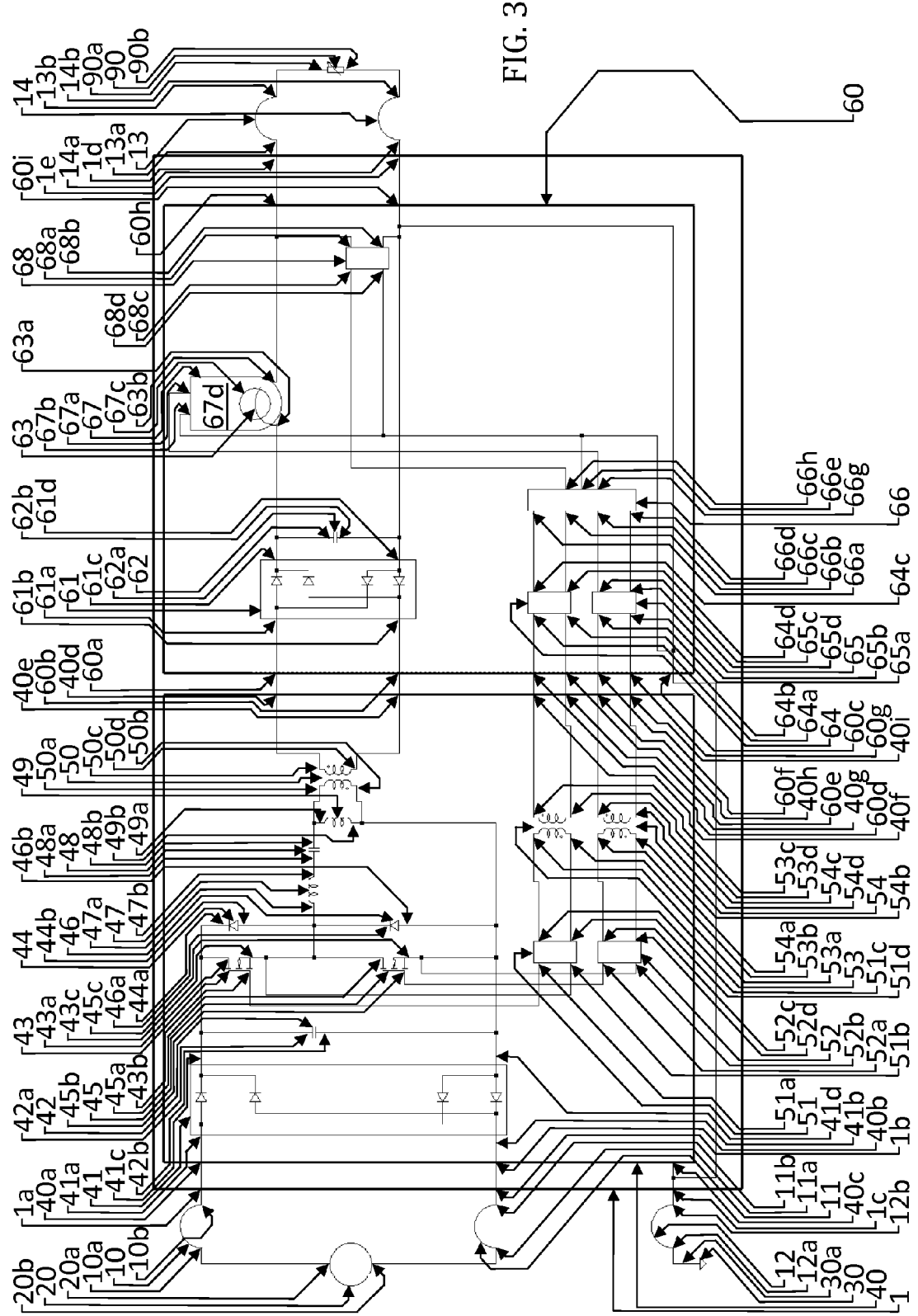
FIG. 3, which is a continuation of FIG. 2, shows additional details that relate to the power conversion actuator, control, sense and feedback functions, for implementing a second embodiment.

Electrically conductive cable 63 provides a means to route the path of current to secondary power circuit's 60 positive differential output terminal 60h, so that it may conduct through a device's aperture capable of measuring the total net current intercepted through the plane of the aperture, said device and aperture to be herein introduced and described in the section describing FIG. 3.

It should be understood that the first embodiment employs a electrically conductive cable 63 intended for use to facilitate inclusion of another device into the circuit, and that other embodiments may not require this provision, so that another embodiment may eliminate electrically conductive cable 63, replacing it instead with a point of contact superimposing points connecting in the first embodiment with electrically conductive cable's 63 terminal 63a onto those connecting with terminal 63b, and that no limit on the applicability of this embodiment is intended, implied, or should be inferred due to choice of employing electrically conductive cable 63 for the purpose of facilitating inclusion of another device into the circuit.

Relevant to the new utility of this circuit recognized by the subject invention, secondary full wave current rectification 61 acts to limit the maximum magnitude of differential working voltages where they are greatest in secondary power circuit 60, by clamping the maximum magnitude of differential voltage on power transformer's 50 secondary terminal 50c with respect to that on its secondary terminal 50d so that it is equal the voltage magnitude of differential voltage of the power converter circuit 1's positive differential output terminal 1d with respect to negative differential output terminal 1e, plus the addition of forward voltage drops of the secondary full wave current rectification 61, plus the addition of forward voltage drops due to current conducting through any secondary stray resistances or semiconductor(s) in series-connection in the series circuit that includes power transformer's 50 secondary terminals 50c and 50d, secondary full wave current rectification 61, and the parallel connection of secondary capacitor 62, electrically conductive cable 63, power converter circuit 1's positive differential output terminal 1d and negative differential output terminal 1e, electrically conductive cables 13 and 14, and output load 90. Current-compliant impedance is a term used herein to signify for a general case the overall impedance presented to the rectifier output terminals by the combination and connection of circuit elements as they present a load to the rectifier output terminals, the circuit elements comprising in the specific case of the first embodiment of FIG. 2 the parallel connection of secondary capacitor 62 and electrically conductive cable 63 and power converter circuit 1's positive differential output terminal 1d and power converter circuit 1's negative differential output terminal 1e and electrically conductive cable 13 and electrically conductive cable 14 and output load 90. Impedance current maximum magnitude is a term used herein to signify the maximum magnitude of the current which passes through said current-compliant impedance. Impedance voltage drop is the term used herein to signify the voltage drop caused to occur across said current-compliance impedance due to the current which passes through said current-compliant impedance.

Control variables which may be utilized in the first embodiment, as shown in FIG. 2, comprise peak source voltage magnitude appearing on alternating-current source terminal and operating frequency of MOSFET switches, said MOSFET switches also referred to herein as switching devices, which may comprise any type of controllable electron valve. Control may be effected through feedforward or feedback techniques. Control variables may be adjusted in order to effect values of output variables, said output variables comprising voltage, current, and power at any location in the output circuit.

FIG. 3, which is a continuation of FIG. 2, shows additional details that relate to the power converter circuit's 1 actuator, control, sense and feedback functions, as they are referred to in system engineering terminology, for implementing the second embodiment.

In addition to terminals and connections described in FIG. 1 and FIG. 2, primary power circuit 40 also has in-phase driver one terminal 40f, reverse-phase driver one terminal 40g, in-phase driver two terminal 40h, and reverse-phase driver two terminal 40i.

In addition to terminals and connections described in FIG. 1 and FIG. 2, secondary power circuit 60 also has actuator one in-phase terminal 60d, actuator one reverse-phase terminal 60e, actuator two in-phase terminal 60f, and actuator two reverse-phase terminal 60g.

Secondary power circuit's 60 actuator one in-phase terminal 60d is connected to primary power circuit's 40 in-phase driver one terminal 40f. Secondary power circuit's 60 actuator one reverse-phase terminal 60e is connected to primary power circuit's 40 reverse-phase driver one terminal 40g. Secondary power circuit's 60 actuator two in-phase terminal 60f is connected to primary power circuit's 40 in-phase driver two terminal 40h. Secondary power circuit's 60 actuator two reverse-phase terminal 60g is connected to primary power circuit's 40 reverse-phase driver two terminal 40i.

Some connections between secondary power circuit 60 and primary power circuit 40 are for the purpose of secondary power circuit 60 actuating the power conversion process in primary power circuit 40. Secondary power circuit's 60 terminals being used for this purpose are actuator one in-phase terminal 60d, actuator one reverse-phase terminal 60e, actuator two in-phase terminal 60f, and actuator two reverse-phase terminal 60g. Primary power circuit's 40 terminals being used for this purpose are in-phase driver one terminal 40f, reverse-phase driver one terminal 40g, in-phase driver two terminal 40h, and reverse-phase driver two terminal 40i.

In addition to terminals and connections described in FIG. 2, MOSFET switching device one 43 also has gate terminal 43b, and MOSFET switching device two 45 also has gate terminal 45b.

The second embodiment shown in FIG. 3 includes a driver circuit one 51 connected within the primary power circuit 40. Driver circuit one 51 has in-phase output terminal 51a, reverse-phase output terminal 51b, reverse-phase input terminal 51c, and in-phase input terminal 51d. Driver circuit one 51 has its in-phase output terminal 51a connected to MOSFET switching device one's 43 gate terminal 43b, and its reverse-phase output terminal 51b connected to MOSFET switching device one's 43 source terminal 43c, anti-diode one's 44 terminal 44b, MOSFET switching device two's 45 drain terminal 45a, anti-diode two's 46 terminal 46a, and primary series inductance's 47 terminal 47a.

Driver circuit one 51 performs a function of conditioning and delivering power to MOSFET switching device one's 43 gate terminal 43b and source terminal 43c, necessary to drive and maintain MOSFET switching device one 43 in either an on-state or an off-state, or to cause transition from on-state to off-state, or from off-state to on-state.

The second embodiment shown in FIG. 3 includes a driver circuit two 52 connected within the primary power circuit 40. Driver circuit two 52 has in-phase output terminal 52a, reverse-phase output terminal 52b, reverse-phase input terminal 52c, and in-phase input terminal 52d. Driver circuit two 52 has its in-phase output terminal 52a connected to MOSFET switching device two's 45 gate terminal 45b, and its reverse-phase output terminal 52b connected to MOSFET switching device two's 45 source terminal 45c, anti-parallel diode two's 46 terminal 46b, power transformer's 50 primary terminal 50b, shunt inductor's 49 terminal 49b, primary bulk capacitor's 42 negative differential terminal 42b, and primary rectifier's 41 negative differential output terminal 41d.

Driver circuit two 52 performs a function of conditioning and delivering power to MOSFET switching device two's 45 gate terminal 45b and source terminal 45c, necessary to drive and maintain MOSFET switching device two 45 in either an on-state or an off-state, or to cause transition from on-state to off-state, or from off-state to on-state.

The second embodiment shown in FIG. 3 includes a pulse transformer one 53 connected within the primary power circuit 40. Pulse transformer one 53 has insulation system comprising double insulation, which is sufficient to provide safety protection against risk of electric shock, due to hazardous voltage on its primary, to an operator who comes into contact with bare conductors on its secondary. Pulse transformer one 53 has reverse-phase primary output terminal 53a, in-phase primary output terminal 53b, in-phase secondary input terminal 53c, and reverse-phase secondary input terminal 53d. Pulse transformer one 53 has its reverse-phase primary output terminal 53a connected to driver circuit one's 51 reverse-phase input terminal 51c, and its in-phase primary output terminal 53b connected to driver circuit one's 51 in-phase input terminal 51d. Pulse transformer one 53 has its in-phase secondary input terminal 53c connected to primary power circuit's 40 in-phase driver one terminal 40f, and its reverse-phase secondary input terminal 53d connected to primary power circuit's 40 reverse-phase driver one terminal 40g.

Pulse transformer one 53 performs two functions simultaneously that are essential for controlled command and actuation of the MOSFET switching device one 43, so that it switches between on-state and off-state upon command: first, transfer of drive power from secondary power circuit's 60 actuator one in-phase terminal 60d, and actuator one reverse-phase terminal 60e, to the driver circuit one's 51 in-phase input terminal 51d, and reverse-phase input terminal 51c; and second, communication of drive command signal from secondary power circuit's 60 actuator one in-phase terminal 60d, actuator one reverse-phase terminal 60e, to the driver circuit one's 51 in-phase input terminal 51d, and reverse-phase input terminal 51c.

Pulse transformer one 53 also provides a means for insulating elements of its secondary from elements of its primary that is essential to providing protection to an operator against electric shock from hazardous voltages on the primary in the event of physical contact with bare conductive elements on the secondary.

The second embodiment shown in FIG. 3 includes a pulse transformer two 54 connected within the primary power circuit 40. Pulse transformer two 54 has insulation system comprising double insulation that is sufficient to provide safety protection against risk of electric shock, due to hazardous voltage on its primary, to an operator who comes into contact with bare conductors on its secondary. Pulse transformer two 54 has reverse-phase primary output terminal 54a, in-phase primary output terminal 54b, in-phase secondary input terminal 54c, and reverse-phase secondary input terminal 54d. Pulse transformer two 54 has its in-phase secondary input terminal 54c connected to primary power circuit's 40 in-phase driver two terminal 40h, and its reverse-phase secondary input terminal 54d connected to primary power circuit's 40 reverse-phase driver two terminal 40i.

Pulse transformer two 54 performs two functions simultaneously that are essential for controlled command and actuation of the MOSFET switching device two 45 so that it switches between on-state and off-state upon command: first, transfer of drive power from secondary power circuit's 60 actuator one in-phase terminal 60f, and actuator one reverse-phase terminal 60g terminals, to the driver circuit two's 52 in-phase input terminal 52d, and reverse-phase input terminal 52c; and second, communication of drive command signal from secondary power circuit's 60 actuator two in-phase terminal 60f, actuator two reverse-phase terminal 60g, to the driver circuit two's 52 in-phase input terminal 52d, and reverse-phase input terminal 52c.

Pulse transformer two 54 also provides a means for insulating elements of its secondary from elements of its primary that is essential to providing protection to an operator against electric shock from hazardous voltages on the primary in the event of physical contact with bare conductive elements on the secondary.

It should be understood that the second embodiment employs pulse transformer one 53 and pulse transformer two 54 with turns ratios such that they transform power from one set of current and voltage variables into another set that is essentially identical, but that another embodiment may use pulse transformer one 53 and pulse transformer two 54 with different turns ratio to transform power from one set of current and voltage variables into another set, and that no limit on the applicability of this embodiment is intended, implied, or should be inferred due to choice to use pulse transformer one 53 and pulse transformer two 54 in the mode of transforming power in a ratio of one to one, where the differential voltage on transformer one's 53 reverse-phase primary output terminal 53a with respect to in-phase primary output terminal 53b is equal to the differential voltage on transformer one's 53 reverse-phase secondary input terminal 53d with respect to in-phase secondary input terminal 53c, and where the differential voltage on pulse transformer two's 54 reverse-phase primary output terminal 54a with respect to in-phase primary output terminal 54b is equal to the differential voltage on pulse transformer two's 54 reverse-phase secondary input terminal 54with respect to in-phase secondary input terminal 54c.

It should be further understood that the second embodiment employs pulse transformer one 53 and pulse transformer two 54 with insulation construction providing safety protection against electrical shock due to hazardous voltages on their primaries, in the event an operator makes physical contact with bare conductive elements of their secondaries, with said insulation construction classified as double insulation that satisfies one criterion for SELV classification of the secondary circuit to that its secondary terminals are connected to, and that other embodiments may employ pulse transformer one 53 and pulse transformer two 54 with greater or less satisfactory levels of safety protection insulations, or none at all except for functional insulations, and that no limit on the applicability of this embodiment is intended, implied, or should be inferred due to choice of pulse transformer one's 53 and pulse transformer two's 54 insulation construction and characteristics.

It should be yet further understood that the second embodiment separately employs pulse transformer one 53 and pulse transformer two 54, and that other embodiments in place of these may employ a single pulse transformer that performs the functions of both pulse transformer one 53 and pulse transformer two 54, as for instance where two isolated secondary windings may be employed on a single pulse transformer, and that no limit on the applicability of this embodiment is intended, implied, or should be inferred due to choice to employ pulse transformer one 53 and pulse transformer two 54.

It should be yet further understood that the second embodiment employs pulse transformer one 53 and pulse transformer two 54, and that other embodiments may employ different techniques to perform the functions served by pulse transformer one 53 and pulse transformer two 54, as for instance where the source of power being derived in this embodiment through pulse transformer one 53 and pulse transformer two 54 may instead be derived from the primary circuits, or auxiliary primary circuits, or in the case of a primary connected control circuit, where the employed device or devices do not provide direct-current galvanic isolation; and the driver command signal being derived in this embodiment also through pulse transformer one 53 and pulse transformer two 54 may instead be derived through other means, such as through an opto-coupler, or in the case of a primary connected control circuit, where the employed device or devices do not provide direct-current galvanic isolation, and that no limit on the applicability of this embodiment is intended, implied, or should be inferred due to choice to employ pulse transformer one 53 and pulse transformer two 54.

The second embodiment shown in FIG. 3 includes actuator circuit one 64 connected within the secondary power circuit 60. Actuator circuit one 64 has in-phase output terminal 64a, reverse-phase output terminal 64b, in-phase input terminal 64c, and reverse-phase input terminal 64d. Actuator circuit one 64 has its in-phase output terminal 64a connected to secondary power circuit's 60 actuator one in-phase terminal 60d, and its reverse-phase output terminal 64b connected to secondary power circuit's 60 actuator one reverse-phase terminal 60e.

The second embodiment shown in FIG. 3 includes actuator circuit two 65 connected within the secondary power circuit 60. Actuator circuit two 65 has in-phase output terminal 65a, reverse-phase output terminal 65b, in-phase input terminal 65c, and reverse-phase input terminal 65d. Actuator circuit two 65 has its in-phase output terminal 65a connected to secondary power circuit's 60 actuator two in-phase terminal 60f, and its reverse-phase output terminal 65b connected to secondary power circuit's 60 actuator two reverse-phase terminal 60g.

Actuator circuit one 64 acts as an interface to pulse transformer one 53, and subsequently to driver circuit one 51. Actuator circuit one 64 acts through secondary power circuit's 60 actuator one in-phase terminal 60d connected to primary power circuit's 40 in-phase driver one terminal 40f, and through secondary power circuit's 60 actuator one reverse-phase terminal 60e connected to primary power circuit's 40 reverse-phase driver one terminal 40g, as an interface to pulse transformer one 53, and subsequently to driver circuit one 51.

Actuator circuit two 65 acts as an interface to pulse transformer two 54, and subsequently to driver circuit two 52. Actuator circuit two 65 acts through secondary power circuit's 60 actuator two in-phase terminal 60f connected to primary power circuit's 40 in-phase driver two terminal 40h, and through secondary power circuit's 60 actuator two reverse-phase terminal 60g connected to primary power circuit's 40 reverse-phase driver two terminal 40i, as an interface to pulse transformer two 54, and subsequently to driver circuit two 52.

These interfaces, actuator circuit one 64 and actuator circuit two 65, allow their low power input signals to be amplified into higher power output signals, with conditioning of current and voltage rise and fall times, suitable for delivering the instantaneous power and control required by driver circuit one 51 and driver circuit two 52, respectively.

The second embodiment shown in FIG. 3 includes control circuit 66 connected within the secondary power circuit 60. The control circuit 66 has actuator one in-phase output terminal 66a, actuator one reverse-phase output terminal 66b, actuator two in-phase output terminal 66c, actuator two reverse-phase output terminal 66d, ground terminal 66e, current monitor input signal terminal 66g, and secondary terminal voltage monitor input signal terminal 66h. The control circuit 66 has its actuator one in-phase output terminal 66a connected to actuator circuit one's 64 in-phase input terminal 64c, and its reverse-phase output terminal 66b connected to actuator circuit one's 64 reverse-phase input terminal 64d. The control circuit 66 has its actuator two in-phase output terminal 66c connected to actuator circuit two's 65 in-phase input terminal 65c, and its reverse-phase output terminal 66d connected to actuator circuit two's 65 reverse-phase input terminal 65d. The control circuit 66 has its ground terminal 66e connected to secondary capacitor's 62 negative differential terminal 62b, secondary full wave current rectification elements' 61 negative differential output terminal 61d, secondary power circuit's 60 negative differential output terminal 60i, and secondary power circuit's 60 input ground terminal 60c.

Control circuit 66 acts to coordinate the switching actions of MOSFET switching device one 43 and MOSFET switching device two 45, by controlling actuator one 64 through control circuit's 66 actuator one in-phase output terminal 66a, actuator one reverse-phase output terminal 66b, and by controlling actuator two 65 through control circuit's 66 actuator two in-phase output terminal 66c, actuator two reverse-phase output terminal 66d.

Control circuit 66 controls the operating frequency of switching actions of MOSFET switching device one 43 and MOSFET switching device two 45. Control circuit 66 performs this control to subsequently regulate the output variables of voltage and current being reported through control circuit's 66 current monitor input signal terminal 66g, and secondary terminal voltage monitor input signal terminal 66h, both with respect to ground terminal 66e. The range of operating frequencies in the second embodiment, shown in FIG. 3, is limited control circuit 66 to correspond with a behavior of primary resonant circuit comprising primary series inductance 47, primary series capacitor 48, and shunt inductor 49, and power transformer 50, such that greater gain ratio of differential voltage across power transformer's 50 primary terminals 50a, 50b, to differential voltage across primary bulk capacitor's 42 positive differential terminal 42a, negative differential terminal 42b, results from lower working frequency, and lower gain ratio results from higher operating frequency.

It should be understood that the second embodiment employs through control circuit 66 a means of regulation for output load variables of voltage or current that are sourced by power converter circuit 1, and that other embodiments may employ fewer or greater number, or types of regulated variables, or none at all such as for an open loop control, and that no limit on the applicability of this embodiment is intended, implied, or should be inferred due to choice of regulation and its particular variables of regulation.

It should be further understood that the second embodiment connects control circuit 66 within the secondary power circuit 60, and another embodiment may instead connect its control circuit within the primary power circuit 40, or may incorporate lumped or distributed control circuits connected within primary and secondary circuits, along with the necessary subsequent changes to how sensed output variables have their monitor and fault signals passed through an isolation boundary from secondary power circuit 60 to the control circuit in primary power circuit 40, and that no limit on the applicability of this embodiment is intended, implied, or should be inferred due to choice of connecting control circuit 66 within the secondary power circuit 60.

The second embodiment shown in FIG. 3 includes current sensor 67 connected within the secondary power circuit 60. Current sensor 67 has in-phase output terminal 67a, reverse-phase output terminal 67b, and a current sensing aperture 67c, with a front face 67d through which passes electrically conductive cable 63. Current sensor 67 incorporates a Hall Effect device to detect current conducting through its current sensing aperture 67c in a direction from its front face 67d through current sensor's 67 current sensing aperture 67c. Electrically conductive cable 63 is routed through current sensing aperture 67c, with conductive cable's 63 terminal 63a being extended from current sensor's 67 front face 67d, and conductive cable's 63 terminal 63b being passed through current sensor's 67 current sensing aperture 67c, beyond which it is connected into the circuit, so that conventional current conducted in the direction from current sensor's 67 front face 67d conducting through current sensing aperture 67c corresponds to direction of conventional current conducted from secondary capacitor's 62 positive differential terminal 62a and secondary full wave current rectification's 61 positive differential output terminal 61c to the secondary power circuit's 60 positive differential output terminal 60h. Current sensor 67 has its in-phase output terminal 67a connected to control circuit's 66 current monitor input signal 66g, and its reverse-phase output terminal 67b connected to control circuit's 66 ground terminal 66e, secondary capacitor's 62 negative differential terminal 62b, secondary full wave current rectification's 61 negative differential output terminal 61d, secondary power circuit's 60 negative differential output terminal 60i, and secondary power circuit's 60 input ground terminal 60c.

Current sensor 67 senses the polarity and level of current passing through its current sensing aperture 67c, said current subsequently being conducted to power converter circuit's 1 positive differential output terminal 1d via secondary power circuit's 60 positive differential terminal 60h. Current sensor 67 then represents this measured current polarity and level through a signal it generates on in-phase output terminal 67a with respect to its reverse-phase output terminal 67b, this signal then being conducted to control circuit's 66 current monitor input signal 66g with respect to control circuit's 66 ground terminal 66e.

It should be understood that the second embodiment employs current sensor 67 that is based upon its incorporation of a Hall Effect sensing device, and other embodiments may instead employ different techniques to measure and report current polarity and levels, or may choose to not measure polarity or current levels, and that no limit on the applicability of this embodiment is intended, implied, or should be inferred due to the use of current sensor 67 and its particular current sensing technique.

The second embodiment shown in FIG. 3 includes voltage sensor 68 connected within the secondary power circuit 60. Voltage sensor 68 has positive differential load terminal 68a, negative differential load terminal 68b, positive differential output terminal 68c, and negative differential output terminal 68d. Voltage sensor 68 has its positive differential load terminal 68a connected to secondary power circuit's 60 positive differential output terminal 60h and electrically conductive cable's 63 terminal 63b. Voltage sensor 68 has its negative differential load terminal 68b connected to secondary capacitor's 62 negative differential terminal 62b, secondary full wave current rectification's 61 negative differential output terminal 61d, secondary power circuit's 60 negative differential output terminal 60i, and secondary power circuit's 60 ground input terminal 60c. Voltage sensor 68 has its positive differential output terminal 68c connected to control circuit's 66 secondary terminal voltage monitor input signal terminal 66h, and its negative differential output terminal 68d connected to control circuit's 66 ground terminal 66e, secondary capacitor's 62 negative differential terminal 62b, secondary full wave current rectification elements' 61 negative differential output terminal 61d, secondary power circuit's 60 negative differential output terminal 60i, and secondary power circuit's 60 input ground terminal 60c.

Voltage sensor 68 senses the polarity and magnitude of differential voltage appearing on secondary power circuit's 60 positive differential output terminal 60h with respect to negative differential output terminal 60i. Voltage sensor 68 then represents this measured voltage level through a signal it generates on its positive differential output terminal 68c with respect to its negative differential output terminal 68d, this signal then being conducted to control circuit's 66 secondary terminal voltage monitor input signal terminal 66h with respect to control circuit's 66 ground terminal 66e.

It should be understood that the second embodiment employs voltage sensor 68 that senses and measures differential voltage appearing on secondary power circuit's 60 positive differential output terminal 60h with respect to negative differential output terminal 60i, and that other embodiments may instead measure voltage at a different point, or points, or may choose to not measure voltage levels, and that no limit on the applicability of this embodiment is intended, implied, or should be inferred due to the use of voltage sensor 68 and the particular location that it senses and measures voltage at.

Figure 4:
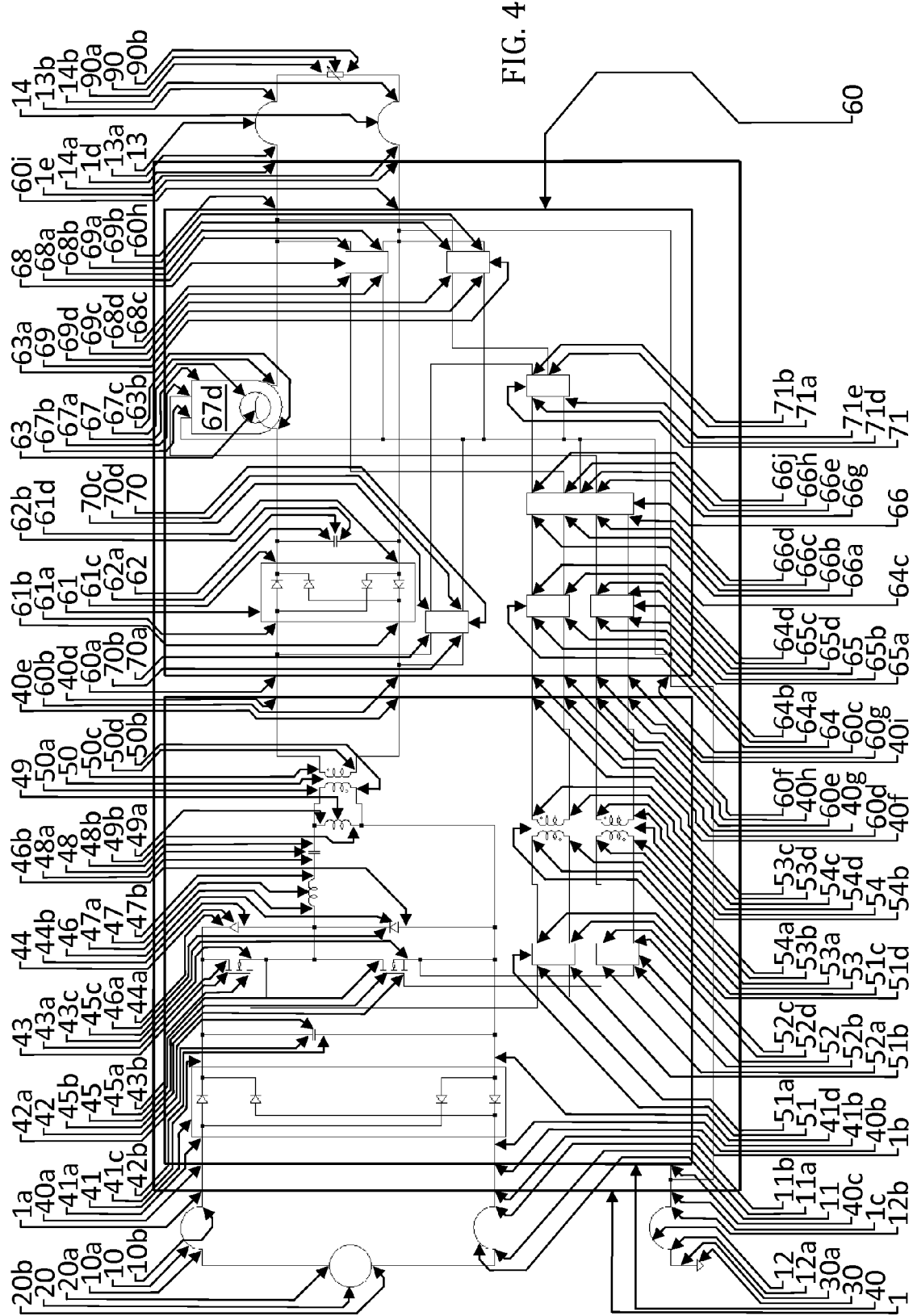
FIG. 4, which is a continuation of FIG. 3, shows additional details that relate to the power conversion fault detection, and fault limit control functions, for implementing a third embodiment.

Control variables employed in the second embodiment, as shown in FIG. 3, comprise the peak source voltage magnitude on the alternating-current source terminal, and the operating frequency of the alternating-current current-compliant voltage source. Output variables employed, which are to be regulated or limited, some through use of any of a plurality of feedback signals, and some through use of control circuit 66, in the third embodiment as shown in FIG. 4, comprise current passing through aperture of current sensor 67, and voltages appearing at voltage sensor's 68 positive differential load terminal 68a and negative differential load terminal 68b. Measurement and feedback variables employed in the second embodiment, as shown in FIG. 3, comprise measurement signal issued by current sensor's 67 in-phase output terminal 67a with respect to its reverse-phase output terminal 67b, and measurement signal issued by voltage sensor's 68 output signal appearing on positive differential output terminal 68c with respect to negative differential output terminal 68d. It should be understood that the choice of control, output, measurement and feedback variables for the second embodiment, as shown in FIG. 3, may be replaced by other choices in other embodiments, and that no limit on the selection of these choices is intended or meant to be implied. It should be further understood that control variables may in some cases be influenced through either feedback control methods or feedforward control methods, and the implementation of control methods in the second embodiment, as shown in FIG. 3, is not intended to limit or imply limitation in other embodiments.

FIG. 4, which is a continuation of FIG. 3, shows additional details for implementing a third embodiment that relate to the power converter circuit's fault detection and fault limit control functions, and that act to prevent loss of protection from electric shock due to a single fault.

In addition to the terminals and connections of control circuit 66 described herein for FIG. 3, control circuit 66 also has fault input signal terminal 66j in the third embodiment of the present invention as shown in FIG. 4.

The third embodiment shown in FIG. 4 includes output over-voltage sensor 69 connected within the secondary power circuit 60. Output over-voltage sensor 69 has positive differential load terminal 69a, negative differential load terminal 69b, positive differential output terminal 69c, and negative differential output terminal 69d. Output over-voltage sensor 69 has its positive differential load terminal 69a connected to secondary power circuit's 60 positive differential output terminal 60h, electrically conductive cable's 63 terminal 63b, and voltage sensor's 68 positive differential load terminal 68a. Output over-voltage sensor 69 has its negative differential load terminal 69b connected to its negative differential output terminal 69d, secondary capacitor's 62 negative differential terminal 62b, secondary full wave current rectification elements' 61 negative differential output terminal 61d, secondary power circuit's 60 negative differential output terminal 60i, secondary power circuit's 60 ground input terminal 60c, voltage sensor's 68 negative differential load terminal 68b, and control circuit's 66 ground terminal 66e.

The third embodiment shown in FIG. 4 includes transformer over-voltage sensor 70 connected within the secondary power circuit 60. Transformer over-voltage sensor 70 has input terminals 70a, 70b, positive differential output terminal 70c, and negative differential output terminal 70d. Transformer over-voltage sensor 70 has its input terminal 70a connected to secondary power transformer's 50 secondary terminal 50c, and secondary full wave current rectification's 61 alternating-current input terminal 61a. Transformer over-voltage sensor 70 has its input terminal 70b connected to secondary power transformer's 50 secondary terminal 50d, and secondary full wave current rectification's 61 alternating-current input terminal 61b.

The third embodiment shown in FIG. 4 includes fault limit circuit 71 connected within the secondary power circuit 60. Fault limit circuit 71 has output over-voltage fault input terminal 71a, transformer over-voltage fault input terminal 71b, fault shutdown terminal 71d, and signal ground terminal 71e. Fault limit circuit 71 has its output over-voltage fault input terminal 71a connected to output over-voltage sensor's 69 positive differential output terminal 69c. Fault limit circuit 71 has its transformer over-voltage fault input terminal 71b connected to transformer over-voltage sensor's 70 positive differential output terminal 70c. Fault limit circuit 71 has its signal ground terminal 71e connected to output over-voltage sensor's 69 negative differential output terminal 69d and negative differential load terminal 69b, transformer over-voltage sensor's 70 negative differential output terminal 70d, control circuit's 66 ground terminal 66e, secondary capacitor's 62 negative differential terminal 62b, secondary full wave current rectification elements' 61 negative differential output terminal 61d, secondary power circuit's 60 negative differential output terminal 60i, and secondary power circuit's 60 input ground terminal 60c. Fault limit circuit 71 has its fault shutdown terminal 71d connected to control circuit's 66 fault input signal terminal 66j.

An output over-voltage type fault signal may be issued by output over-voltage sensor's 69 positive differential output terminal 69c with respect to its negative differential output terminal 69d, and received by fault limit circuit's 71 output over-voltage fault input terminal 71a with respect to fault limit circuit's 71 signal ground terminal 71e; or a transformer over-voltage type fault may be issued by transformer over-voltage sensor's 70 positive differential output terminal 70c with respect to its negative differential output terminal 70d, and received by transformer over-voltage fault input terminal 71b with respect to fault limit circuit's 71 signal ground terminal 71e; which for either or both of these events will result in fault limit circuit 71 issuing a fault signal on its fault shutdown terminal 71d with respect to its signal ground terminal 71e. A fault signal issued through fault limit circuit's 71 fault shutdown terminal 71d with respect to its signal ground terminal 71e will be conducted to control circuit's 66 fault input signal terminal 66j with respect to ground terminal 66e, and control circuit 66 will subsequently cause the switching actions of MOSFET switching device one 43 and MOSFET switching device two 45 to cease, and result in them being maintained at high impedances corresponding to their off-states. Resetting the latched off condition requires first removing, then restoring of alternating-current mains supply power at power converter circuit's 1 line terminal 1a.

Output over-voltage sensor 69 senses the polarity and level of differential voltage appearing on secondary power circuit's 60 positive differential output terminal 60h with respect to negative differential output terminal 60i. Output over-voltage sensor 69 then compares this measured voltage polarity and level with a preset limit value, and determines that an output over-voltage type fault exists in the event the measured voltage magnitude exceeds the preset limit value. In the event an output over-voltage type fault exists, output over-voltage sensor 69 issues a signal that it generates on its positive differential output terminal 69c with respect to its negative differential output terminal 69d, this signal then being conducted to fault limit circuit's 71 output over-voltage fault input terminal 71a with respect to fault limit circuit's 71 signal ground terminal 71e.

It should be understood that the third embodiment employs output over-voltage sensor 69 that senses and measures differential voltage appearing on secondary power circuit's 60 positive differential output terminal 60h with respect to negative differential output terminal 60i, and that other embodiments may instead measure absolute or differential voltage at a different point, or points, or may choose to not measure voltage levels, and that no limit on the applicability of this embodiment is intended, implied, or should be inferred due to the use of output over-voltage sensor 69 and the particular locations at that it senses and measures differential voltage at.

Transformer over-voltage sensor 70 senses the magnitude of differential voltage appearing on secondary power transformer's 50 secondary terminal 50c with respect to secondary power transformer's 50 secondary terminal 50d. Transformer over-voltage sensor 70 then compares this measured voltage magnitude's value with a preset limit value, and determines that a transformer over-voltage type fault exists in the event the measured voltage magnitude exceeds the preset limit value. In the event a transformer over-voltage type fault exists, transformer over-voltage sensor 70 issues a signal that it generates on its positive differential output terminal 70c with respect to its negative differential output terminal 70d, this signal then being conducted to fault limit circuit's 71 transformer over-voltage fault input terminal 71b with respect to fault limit circuit's 71 signal ground terminal 71e.

It should be understood that the third embodiment employs means of fault detection and fault limit control for differential voltage variables of secondary circuit output terminal voltage and transformer secondary voltage and that other embodiments may employ fewer or greater number or types of fault detection variables and subsequent fault limit controls, or none at all, and that no limit on the applicability of this embodiment is intended, implied, or should be inferred due to choice of fault limit control, particular differential voltage variables for detection, or particular modes of fault limit operation.

Control variables employed in the third embodiment, as shown in FIG. 4, comprise the peak source voltage magnitude on the alternating-current source terminal, and the operating frequency of the alternating-current current-compliant voltage source. Output variables employed, which are to be regulated or limited, some through use of fault limit circuit 71, some through use of any of a plurality of feedback signals, and some through use of control circuit 66, in the third embodiment as shown in FIG. 4, comprise current passing through aperture of current sensor 67, voltages appearing at voltage sensor's 68 positive differential load terminal 68a and negative differential load terminal 68b, voltages appearing at output over-voltage sensor's 69 positive differential load terminal 69a and negative differential load terminal 69b, and voltages appearing at transformer over-voltage sensor's 70 input terminals 70a and 70b. Measurement and feedback variables employed in the third embodiment, as shown in FIG. 4, comprise measurement signal issued by current sensor's 67 in-phase output terminal 67a with respect to its reverse-phase output terminal 67b, measurement signal issued by voltage sensor's 68 output signal appearing on positive differential output terminal 68c with respect to negative differential output terminal 68d, measurement signal issued by output over-voltage sensor's 69 positive differential output terminal 69c with respect to its negative differential output terminal 69d, and measurement signal issued by over-voltage sensor's 70 positive differential output terminal 70c with respect to its negative differential output terminal 70d. It should be understood that the choice of control, output, measurement and feedback variables for the third embodiment, as shown in FIG. 4, may be replaced by other choices in other embodiments, and that no limit on the selection of these choices is intended or meant to be implied. It should be further understood that control variables may in some cases be influenced through either feedback control methods or feedforward control methods, and the implementation of control methods in the third embodiment, as shown in FIG. 4, is not intended to limit or imply limitation in other embodiments.

Figure 5:
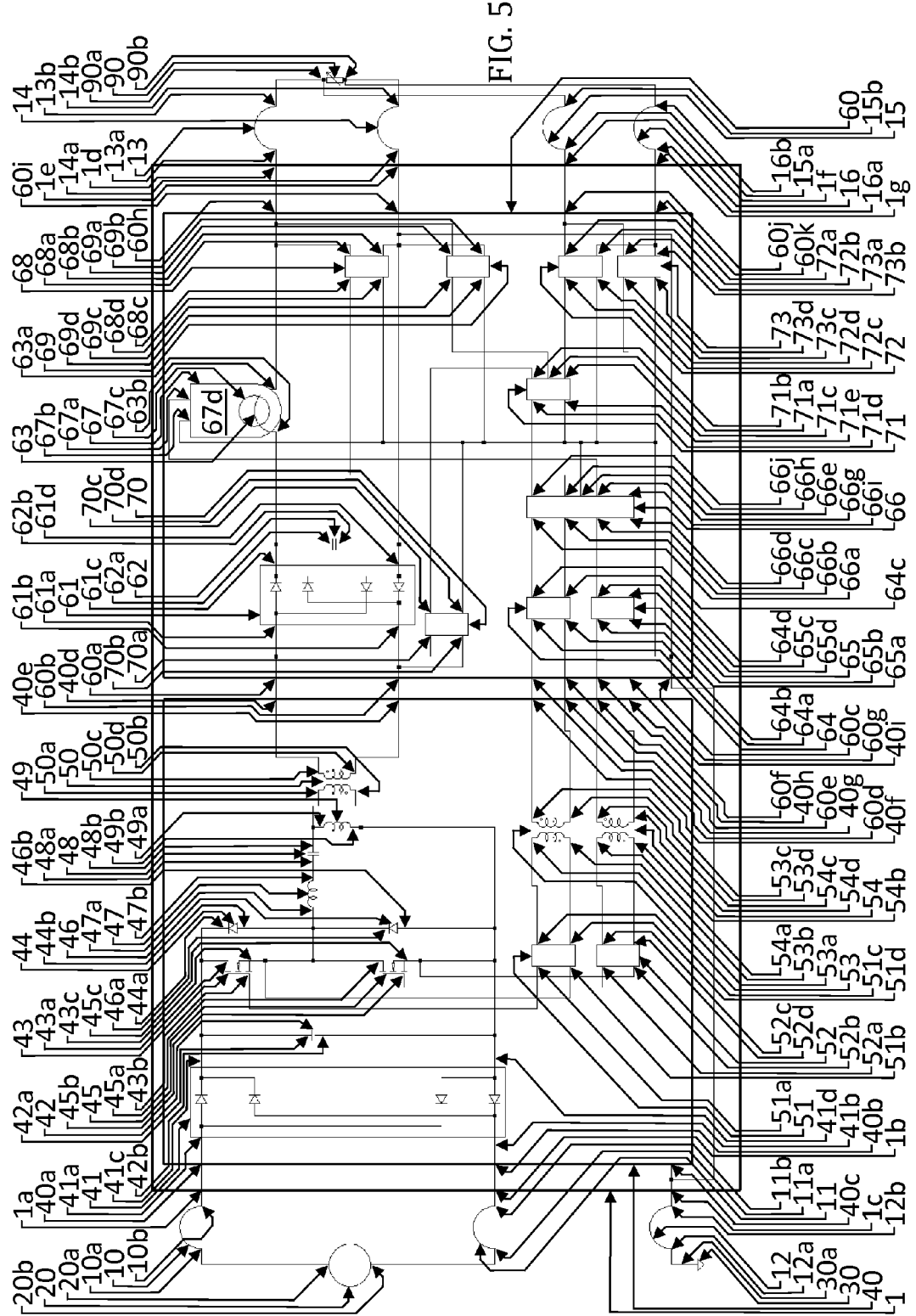
FIG. 5, which is a continuation of FIG. 4, shows additional details relating to the power conversion supplementary fault detection, supplementary fault limit control, and supplementary sense and feedback functions, for implementing a fourth embodiment.

FIG. 5 is a continuation of FIG. 4, and describes a fourth embodiment through additional details relating to the power converter circuit's supplementary fault detection, supplementary fault limit control, and supplementary sense and feedback functions, which are generally employed in high precision power conversion systems to provide higher reliability and greater precision safeguard for a load, whether remote or local, against poor regulation or over-voltage stress, especially where voltage drops in electrically conductive cables 13, and 14 may become significant errors with respect to the load's regulation and fault detection. It should be understood that the embodiments of FIG. 1 through FIG. 4, and the embodiment of FIG. 5 are each exemplary embodiments and that numerous other ways of implementing the present invention will become apparent after reviewing this description.

In addition to terminals and connections described in FIG. 1 through FIG. 4, power converter circuit 1 in FIG. 5 also has positive differential load sense terminal 1f, and negative differential load sense terminal 1g.

In addition to terminals and connections described in FIG. 1 through FIG. 4, secondary power circuit 60 in FIG. 5 also has positive differential load sense terminal 60j, and negative differential load sense terminal 60k.

Secondary power circuit's 60 positive differential load sense terminal 60j is connected to power converter circuit's 1 positive differential load sense terminal 1f, and secondary power circuit's 60 negative differential load sense terminal 60k is connected to power converter circuit's 1 negative differential load sense terminal 1g.

The fourth embodiment shown in FIG. 5 includes the application of electrically conductive cables 15, 16 connecting the power converter circuit 1 to the output load 90. Electrically conductive cable 15 has terminals 15a, 15b. Electrically conductive cable 16 has terminals 16a, 16b. Electrically conductive cable 15 has terminal 15a connected to power converter circuit's 1 positive differential load sense terminal 1f, and terminal 15b is connected to output load's 90 positive differential terminal 90a. Electrically conductive cable 16 has terminal 16a connected to power converter circuit's 1 negative differential load sense terminal 1g, and terminal 16b is connected to output load's 90 negative differential terminal 90b.

The fourth embodiment shown in FIG. 5 includes additional terminals and connections for fault limit circuit 71 connected within the secondary power circuit 60. In addition to those terminals and connections previously mentioned herein, fault limit circuit 71 has load over-voltage fault input terminal 71c. Also, in addition to over-voltage fault types in FIG. 4 previously described herein, the embodiment shown in FIG. 5 has a load over-voltage type fault signal, which upon its issuance is received by fault limit circuit 71, which subsequently acts in the same manner previously described herein for other over-voltage type faults, causing the switching actions of MOSFET switching device one 43 and MOSFET switching device two 45 to cease, and resulting in them being maintained in high impedance states corresponding to their off-states. Resetting the latched off condition requires first removing, then restoring of alternating-current mains supply power at power converter circuit's 1 line terminal 1a, just as in the case of over-voltage faults herein previously described.

The fourth embodiment shown in FIG. 5 includes load over-voltage sensor 72 connected within the secondary power circuit 60. Load over-voltage sensor 72 has positive differential load terminal 72a, negative differential load terminal 72b, positive differential output terminal 72c, and negative differential output terminal 72d. Load over-voltage sensor 72 has its positive differential load terminal 72a connected to secondary power circuit's 60 positive differential load sense terminal 60j. Load over-voltage sensor 72 has its negative differential load terminal 72b connected to secondary power circuit's 60 negative differential load sense terminal 60k. Load over-voltage sensor 72 has its positive differential output terminal 72c connected to fault circuit's 71 load over-voltage input terminal 71c, and its negative differential output terminal 72d connected to fault circuit's 71 signal ground terminal 71e, output over-voltage sensor's 69 negative differential output terminal 69d and negative differential load terminal 69b, transformer over-voltage sensor's 70 negative differential output terminal 70d, control circuit's 66 ground terminal 66e, secondary capacitor's 62 negative differential terminal 62b, secondary full wave current rectification's 61 negative differential output terminal 61d, secondary power circuit's 60 negative differential output terminal 60i, voltage sensor's 68 negative differential output terminal 68d and negative differential load terminal 68b, and secondary power circuit's 60 input ground terminal 60c.

In addition to those sensed variables that are receivedas signals by fault limit circuit 71 described herein for the purpose of fault detection and fault limit control in FIG. 4, the embodiment shown in FIG. 5 causes a fault limit circuit 71 to generate a fault signal on its positive differential output terminal 71d when the differential voltage of output load 90's positive differential terminal 90a with respect to negative differential terminal 90b exceeds an established maximum threshold value, and consequently a load over-voltage fault signal conducts from load over-voltage sensor's 72 positive differential output terminal 72c to fault limit circuit's 71 load over-voltage fault input terminal 71c. In this event, fault limit circuit's 71 fault shutdown terminal 71d conducts a fault signal to control circuit's 66 fault input signal terminal 66j, to which control circuit 66 acts with respect to this signal in the same manner herein described in the description of FIG. 4 for other signals intended for purpose of fault limit and control, causing the switching actions of MOSFET switching device one 43 and MOSFET switching device two 45 to cease, and resulting in them being maintained in high impedance states corresponding to their off-states. Resetting the latched off condition requires first removing, then restoring of alternating-current mains supply power at power converter circuit's 1 line terminal 1a, just as in the case of over-voltage faults herein previously described.

The fourth embodiment shown in FIG. 5 includes additional terminals and connections for control circuit 66 connected within the secondary power circuit 60. In addition to those terminals and connections previously mentioned herein, control circuit 66 has load voltage monitor input signal terminal 66i.

The fourth embodiment shown in FIG. 5 includes load voltage sensor 73 connected within the secondary power circuit 60. Load voltage sensor 73 has positive differential load terminal 73a, negative differential load terminal 73b, positive differential output terminal 73c, and negative differential output terminal 73d. Load voltage sensor 73 has its positive differential load terminal 73a connected to secondary power circuit's 60 positive differential load sense terminal 60j, and load over-voltage sensor's 72 positive differential load terminal 72a. Load voltage sensor 73 has its negative differential load terminal 73b connected to secondary power circuit's 60 negative differential load sense terminal 60k, and load over-voltage sensor's 72 negative differential load terminal 72b. Load voltage sensor's 73 positive differential output terminal 73c is connected to control circuit's 66 load voltage monitor input signal terminal 66i. Load voltage sensor's 73 negative differential output terminal 73d is connected to control circuit's 66 signal ground terminal 66e, fault limit circuit's 71 signal ground terminal 71e, load over-voltage sensor's 72 negative differential output terminal 72d, output over-voltage sensor's 69 negative differential output terminal 69d and negative differential load terminal 69b, transformer over-voltage sensor's 70 negative differential output terminal 70d, control circuit's 66 ground terminal 66e, secondary capacitor's 62 negative differential terminal 62b, secondary full wave current rectification's 61 negative differential output terminal 61d, secondary power circuit's 60 negative differential output terminal 60i, voltage sensor's 68 negative differential output terminal 68d and negative differential load terminal 68b, and secondary power circuit's 60 input ground terminal 60c.

In addition to those sensed variables of current and voltage previously described herein for the second embodiment shown in FIG. 3, and received by control circuit 66 for the purpose of output variable regulation, the fourth embodiment shown in FIG. 5 has a load voltage sense signal generated by load voltage sensor's 73 positive differential output terminal 73c and conducted to control circuit's 66 load voltage monitor input signal terminal 66i, to which control circuit 66 acts with respect to this signal in the same manner herein described in the description of FIG. 3 for other signals intended for purpose of output variable regulation.

Control variables employed in the fourth embodiment, as shown in FIG. 5, comprise the peak source voltage magnitude on the alternating-current source terminal, and the operating frequency of the alternating-current current-compliant voltage source. Output variables employed, which are to be regulated or limited, some through use of fault limit circuit 71, some through use of any of a plurality of feedback signals, and some through use of control circuit 66, in the fourth embodiment as shown in FIG. 5, comprise current passing through aperture of current sensor 67, voltages appearing at voltage sensor's 68 positive differential load terminal 68a and negative differential load terminal 68b, voltages appearing at output over-voltage sensor's 69 positive differential load terminal 69a and negative differential load terminal 69b, voltages appearing at transformer over-voltage sensor's 70 input terminals 70a and 70b, voltages appearing at load over-voltage sensor's 72 positive differential load terminal 72a and negative differential load terminal 72b, and voltages appearing at load voltage sensor's 73 positive differential load terminal 73a and negative differential load terminal 73b. Measurement and feedback variables employed in the fourth embodiment, as shown in FIG. 5, comprise measurement signal issued by current sensor's 67 in-phase output terminal 67a with respect to its reverse-phase output terminal 67b, measurement signal issued by voltage sensor's 68 output signal appearing on positive differential output terminal 68c with respect to negative differential output terminal 68d, measurement signal issued by output over-voltage sensor's 69 positive differential output terminal 69c with respect to its negative differential output terminal 69d, measurement signal issued by over-voltage sensor's 70 positive differential output terminal 70c with respect to its negative differential output terminal 70d, measurement signal issued by load over-voltage sensor's 72 positive differential output terminal 72c with respect to negative differential output terminal 72d, and measurement signal issued by load voltage sensor's 73 positive differential output terminal 73c with respect to negative differential output terminal 73d. It should be understood that the choice of control, output, measurement and feedback variables for the fourth embodiment, as shown in FIG. 5, may be replaced by other choices in other embodiments, and that no limit on the selection of these choices is intended or meant to be implied. It should be further understood that control variables may in some cases be influenced through either feedback control methods or feedforward control methods, and the implementation of control methods in the fourth embodiment, as shown in FIG. 5, is not intended to limit or imply limitation in other embodiments.

The present invention can be used as a stand-alone power conversion system capable of supplying an efficient power to an output load, whether for instance as a system capable of charging various high or low voltage batteries as its load, efficiently powering an LED load that is efficacious for illumination purposes, or as part of a modular system where it produces a fractional share of the total output power. The present invention can be used also as a stand-alone power conversion system, or constituent of a power system where the expected benefit of reduced size, weight, or manufacturing cost results due to lower maximum working voltage magnitudes in secondary circuits. It will find applicability in numerous areas, including power conditioning, power conversion, power regulation, power backup and redundancy, and power isolation.

The invention having been thus described, it will be obvious that the same may be varied in many ways, not only in construction but also in application. Such variations are not to be regarded as a departure from the spirit and scope of the invention, but rather as modifications intended to be encompassed within the scope of the claims.

What is claimed is:

1. A method for manufacturing a power converter, comprising:
   a) providing an output circuit, and
   b) providing an alternating-current current-compliant voltage source , an alternating-current source terminal, an alternating-current return terminal, an alternating-current return voltage, and a predetermined operating frequency, said alternating-current current-compliant voltage source having said alternating-current source terminal and said alternating-current return terminal, said output circuit being exclusive of the alternating-current current-compliant voltage source, said alternating-current return terminal having said alternating-current return voltage, said alternating-current current-compliant voltage source operating at said predetermined operating frequency, and
   c) providing a peak source voltage magnitude, said alternating-current source terminal having said peak source voltage magnitude with respect to said alternating-current return voltage, and
   d) providing a power transformer, said power transformer having a plurality of primary terminals and a plurality of secondary terminals and a primary input terminal and a primary return terminal, said plurality of primary terminals comprising said primary input terminal and said primary return terminal, said output circuit being inclusive of said plurality of secondary terminals, said output circuit being exclusive of said plurality of primary terminals, and
   e) providing a primary inductance, an operative input means, an operative output means, a primary series inductor, a primary series stray inductance, a primary leakage inductance attributed to the primary terminals, a secondary leakage inductance attributed to the secondary terminals, and a predetermined effective-cumulative series inductance value, said primary inductance having the operative input means as a means of connection to its input, and the operative output means as a means of connection to its output, said primary inductance having said predetermined effective-cumulative series inductance value, said predetermined effective-cumulative series inductance value resulting from at least one inductance selected from the group consisting of said primary series inductor and said primary series stray inductance and said primary leakage inductance and said secondary leakage inductance after analytical reflection to said primary input terminal and said primary return terminal, said output circuit being exclusive of said primary inductance, and
   f) providing an alternating-current voltage-compliant current source, and connection of said operative input operatively with said alternating-current source terminal, said alternating-current voltage-compliant current source comprising alternating-current current-compliant voltage source and said primary inductance and the connection of said operative input operatively with said alternating-current source terminal, and g) providing for a series electrical circuit, and connection of said operative output operatively to said primary input terminal, and connection of said primary return terminal operatively to said alternating-current return terminal, whereby said series electrical circuit comprises said alternating-current voltage-compliant current source and said plurality of primary terminals, and h) providing a rectification means, and a plurality of rectification input terminals, and a plurality of rectification output terminals, said rectification means having said plurality of rectification input terminals and said plurality of rectification output terminals, said rectification means controlling current to occur only in predetermined directions through the rectification output terminals and the rectification input terminals, whereby an alternating-current power source at the rectification input terminals will result in full-wave rectification from the rectification output terminals, said output circuit being inclusive of said rectification means, and i) providing for connection of said rectification input terminals operatively to said plurality of secondary terminals, and j) providing a current-compliant impedance, and a predetermined impedance current maximum magnitude, and an impedance voltage drop across said current-compliant impedance, and a predetermined impedance voltage drop maximum magnitude, whereby said impedance voltage drop across said current-compliant impedance due to said predetermined impedance current maximum magnitude does not exceed said predetermined impedance voltage drop maximum magnitude, and k) providing a plurality of working voltages, and a working voltage maximum magnitude, said plurality of working voltages consisting of all voltages present in said output circuit, said plurality of working voltages having said working voltage maximum magnitude, said working voltage maximum magnitude being limited to voltages present on said plurality of secondary terminals, and l) providing for connection of said current-compliant impedance operatively to the rectification output terminals, whereby said rectification means will clamp said working voltage maximum magnitude to said impedance voltage drop across said current-compliant impedance, whereby said output circuit will have said working voltage maximum magnitude substantially clamped to said predetermined impedance voltage drop maximum magnitude.

2. The method of claim 1 wherein said output circuit is a secondary circuit.

3. The method of claim 1 wherein said plurality of primary terminals are galvanically-isolated from said plurality of secondary terminals.

4. The method of claim 1, further including a plurality of predetermined ranges of impedance complex values for said current-compliant impedance, and a plurality of predetermined impedance current maximum magnitudes, each of said plurality of predetermined ranges of impedance complex values corresponding to a predetermined impedance current maximum magnitude, wherein said current-compliant impedance has a complex value within the corresponding predetermined range of impedance complex values, whereby said impedance voltage drop across said current-compliant impedance due to the corresponding impedance current maximum magnitude does not exceed said predetermined impedance voltage drop maximum magnitude.

5. The method of claim 4, further including an output circuit load, and a predetermined output circuit load impedance maximum magnitude, and a predetermined output circuit load voltage maximum magnitude, and a predetermined output circuit load current maximum magnitude, said output circuit load having said predetermined output circuit load voltage maximum magnitude, said current-compliant impedance comprising said output circuit load, said output circuit load having said predetermined output circuit load impedance maximum magnitude substantially equal to said current-compliant impedance maximum magnitude, and said output circuit load having said predetermined output circuit load current maximum magnitude, said predetermined impedance current maximum magnitude comprising said predetermined output circuit load current maximum magnitude, said predetermined output circuit load current maximum magnitude substantially equal to said predetermined impedance current maximum magnitude, whereby said predetermined output circuit load voltage maximum magnitude will result from said predetermined output circuit load current maximum magnitude passing through said predetermined output circuit load impedance maximum magnitude, and said predetermined output circuit load voltage maximum magnitude is substantially equal to said predetermined impedance voltage drop maximum magnitude.

6. The method of claim 1, further including a primary series capacitor, a plurality of switching devices, and connecting said plurality of switching devices operatively to said primary series capacitor, said alternating-current current-compliant voltage source comprising said primary series capacitor and said plurality of switching devices and the operative connection of said plurality of switching devices to said primary series capacitor, wherein said peak source voltage magnitude is predetermined by said plurality of switching devices.

7. The method of claim 6, further including a plurality of anti-parallel diodes, operatively connecting said plurality of anti-parallel diodes to said switching devices, said alternating-current current-compliant voltage source comprising said plurality of anti-parallel diodes and said plurality of switching devices and said primary series capacitor and the operative connection of said plurality of switching devices to said primary series capacitor and the operative connection of said plurality of anti-parallel diodes to said plurality of switching devices, whereby current may flow bi-directionally from any polarity of voltage appearing at said alternating-current source terminal with respect to said alternating-current return terminal.

8. The method of claim 7 wherein the anti-parallel diodes are intrinsic to the switching devices.

9. The method of claim 1, further including a control variable, an output variable, a feedback signal, a measurement and feedback means of measuring value of said output variable and issuing said feedback signal, a control means to effect said output variable by monitoring said feedback signal and adjusting said control variable, said feedback signal representing the measured value of said output variable, said control variable selected from the group consisting of voltage and operating frequency and current and power, said output variable selected from the group consisting of voltage and current and power.

10. The method of claim 9, wherein said control variable is selected from the group consisting of voltage of said alternating-current current-compliant voltage source and operating frequency of said alternating-current current-compliant voltage source, and said output variable is voltage appearing at a location selected from the group consisting of said output circuit and said output circuit load.

11. A method for power conversion, comprising:
a) providing an output circuit, and
b) providing an alternating-current current-compliant voltage source, an alternating-current source terminal, an alternating-current return terminal, an alternating-current return voltage, and a predetermined operating frequency, said alternating-current current-compliant voltage source having said alternating-current source terminal and said alternating-current return terminal, said output circuit being exclusive of the alternating-current current-compliant voltage source, said alternating-current return terminal having said alternating-current return voltage, said alternating-current current-compliant voltage source operating at said predetermined operating frequency, and
c) providing a peak source voltage magnitude, said alternating-current source terminal having said peak source voltage magnitude with respect to said alternating-current return voltage, and
d) providing a power transformer, said power transformer having a plurality of primary terminals and a plurality of secondary terminals and a primary input terminal and a primary return terminal, said plurality of primary terminals comprising said primary input terminal and said primary return terminal, said output circuit being inclusive of said plurality of secondary terminals, said output circuit being exclusive of said plurality of primary terminals, and
e) providing a primary inductance, an operative input means, an operative output means, a primary series inductor, a primary series stray inductance, a primary leakage inductance attributed to the primary terminals, a secondary leakage inductance attributed to the secondary terminals, and a predetermined effective-cumulative series inductance value, said primary inductance having the operative input means as a means of connection to its input, and the operative output means as a means of connection to its output, said primary inductance having said predetermined effective-cumulative series inductance value, said predetermined effective-cumulative series inductance value resulting from at least one inductance selected from the group consisting of said primary series inductor and said primary series stray inductance and said primary leakage inductance and said secondary leakage inductance after analytical reflection to said primary input terminal and said primary return terminal, said output circuit being exclusive of said primary inductance, and
f) providing an alternating-current voltage-compliant current source, and connection of said operative input operatively with said alternating-current source terminal, said alternating-current voltage-compliant current source comprising alternating-current current-compliant voltage source and said primary inductance and the connection of said operative input operatively with said alternating-current source terminal, and
g) providing for a series electrical circuit, and connection of said operative output operatively to said primary input terminal, and connection of said primary return terminal operatively to said alternating-current return terminal, whereby said series electrical circuit comprises said alternating-current voltage-compliant current source and said plurality of primary terminals, and
h) providing a rectification means, and a plurality of rectification input terminals, and a plurality of rectification output terminals, said rectification means having said plurality of rectification input terminals and said plurality of rectification output terminals, said rectification means controlling current to occur only in predetermined directions through the rectification output terminals and the rectification input terminals, whereby an alternating-current power source at the rectification input terminals will result in full-wave rectification from the rectification output terminals, said output circuit being inclusive of said rectification means, and
i) providing for connection of said rectification input terminals operatively to said plurality of secondary terminals, and
j) providing a current-compliant impedance, and a predetermined impedance current maximum magnitude, and an impedance voltage drop across said current-compliant impedance, and a predetermined impedance voltage drop maximum magnitude, whereby said impedance voltage drop across said current-compliant impedance due to said predetermined impedance current maximum magnitude does not exceed said predetermined impedance voltage drop maximum magnitude, and
k) providing a plurality of working voltages, and a working voltage maximum magnitude, said plurality of working voltages consisting of all voltages present in said output circuit, said plurality of working voltages having said working voltage maximum magnitude, said working voltage maximum magnitude being limited to voltages present on said plurality of secondary terminals, and
l) providing for connection of said current-compliant impedance operatively to the rectification output terminals, whereby said rectification means will clamp said working voltage maximum magnitude to said impedance voltage drop across said current-compliant impedance,
whereby said output circuit will have said working voltage maximum magnitude substantially clamped to said predetermined impedance voltage drop maximum magnitude.

12. The method of claim 11 wherein said plurality of primary terminals are galvanically-isolated from said plurality of secondary terminals.

13. The method of claim 11, further including a plurality of predetermined ranges of impedance complex values for said current-compliant impedance, and a plurality of predetermined impedance current maximum magnitudes, each of said plurality of predetermined ranges of impedance complex values corresponding to a predetermined impedance current maximum magnitude, wherein said current-compliant impedance has a complex value within the corresponding predetermined range of impedance complex values, whereby said impedance voltage drop across said current-compliant impedance due to the corresponding impedance current maximum magnitude does not exceed said predetermined impedance voltage drop maximum magnitude.

14. The method of claim 13, further including an output circuit load, and a predetermined output circuit load impedance maximum magnitude, and a predetermined output circuit load voltage maximum magnitude, and a predetermined output circuit load current maximum magnitude, said output circuit load having said predetermined output circuit load voltage maximum magnitude, said current-compliant impedance comprising said output circuit load, said output circuit load having said predetermined output circuit load impedance maximum magnitude substantially equal to said current-compliant impedance maximum magnitude, and said output circuit load having said predetermined output circuit load current maximum magnitude, said predetermined impedance current maximum magnitude comprising said predetermined output circuit load current maximum magnitude, said predetermined output circuit load current maximum magnitude substantially equal to said predetermined impedance current maximum magnitude, whereby said predetermined output circuit load voltage maximum magnitude will result from said predetermined output circuit load current maximum magnitude passing through said predetermined output circuit load impedance maximum magnitude, and said predetermined output circuit load voltage maximum magnitude is substantially equal to said predetermined impedance voltage drop maximum magnitude.

15. The method of claim 11, further including a primary series capacitor, a plurality of switching devices, and connecting said plurality of switching devices operatively to said primary series capacitor, said alternating-current current-compliant voltage source comprising said primary series capacitor and said plurality of switching devices and the operative connection of said plurality of switching devices to said primary series capacitor, wherein said peak source voltage magnitude is predetermined by said plurality of switching devices.

16. The method of claim 15, further including a plurality of anti-parallel diodes, operatively connecting said plurality of anti-parallel diodes to said switching devices, said alternating-current current-compliant voltage source comprising said plurality of anti-parallel diodes and said plurality of switching devices and said primary series capacitor and the operative connection of said plurality of switching devices to said primary series capacitor and the operative connection of said plurality of anti-parallel diodes to said plurality of switching devices, whereby current may flow bi-directionally from any polarity of voltage appearing at said alternating-current source terminal with respect to said alternating-current return terminal.

17. The method of claim 16 wherein the anti-parallel diodes are intrinsic to the switching devices.

18. The method of claim 11, further including a control variable, an output variable, a feedback signal, a measurement and feedback means of measuring value of said output variable and issuing said feedback signal, a control means to effect said output variable by monitoring said feedback signal and adjusting said control variable, said feedback signal representing the measured value of said output variable, said control variable selected from the group consisting of voltage and operating frequency and current and power, said output variable selected from the group consisting of voltage and current and power.

19. The method of claim 18, wherein said control variable is selected from the group consisting of voltage of said alternating-current current-compliant voltage source and operating frequency of said alternating-current current-compliant voltage source, and said output variable is voltage appearing at a location selected from the group consisting of said output circuit and said output circuit load.

20. A method for limiting voltage in a power converter, comprising:
a) providing an output circuit, and
b) providing an alternating-current current-compliant voltage source, an alternating-current source terminal, an alternating-current return terminal, an alternating-current return voltage, and a predetermined operating frequency, said alternating-current current-compliant voltage source having said alternating-current source terminal and said alternating-current return terminal, said output circuit being exclusive of the alternating-current current-compliant voltage source, said alternating-current return terminal having said alternating-current return voltage, said alternating-current current-compliant voltage source operating at said predetermined operating frequency, and
c) providing a peak source voltage magnitude, said alternating-current source terminal having said peak source voltage magnitude with respect to said alternating-current return voltage, and
d) providing a power transformer, said power transformer having a plurality of primary terminals and a plurality of secondary terminals and a primary input terminal and a primary return terminal, said plurality of primary terminals comprising said primary input terminal and said primary return terminal, said output circuit being inclusive of said plurality of secondary terminals, said output circuit being exclusive of said plurality of primary terminals, and
e) providing a primary inductance, an operative input means, an operative output means, a primary series inductor, a primary series stray inductance, a primary leakage inductance attributed to the primary terminals, a secondary leakage inductance attributed to the secondary terminals, and a predetermined effective-cumulative series inductance value, said primary inductance having the operative input means as a means of connection to its input, and the operative output means as a means of connection to its output, said primary inductance having said predetermined effective-cumulative series inductance value, said predetermined effective-cumulative series inductance value resulting from at least one inductance selected from the group consisting of said primary series inductor and said primary series stray inductance and said primary leakage inductance and said secondary leakage inductance after analytical reflection to said primary input terminal and said primary return terminal, said output circuit being exclusive of said primary inductance, and
f) providing an alternating-current voltage-compliant current source, and connection of said operative input operatively with said alternating-current source terminal, said alternating-current voltage-compliant current source comprising alternating-current current-compliant voltage source and said primary inductance and the connection of said operative input operatively with said alternating-current source terminal, and
g) providing for a series electrical circuit, and connection of said operative output operatively to said primary input terminal, and connection of said primary return terminal operatively to said alternating-current return terminal, whereby said series electrical circuit comprises said alternating-current voltage-compliant current source and said plurality of primary terminals, and
h) providing a rectification means, and a plurality of rectification input terminals, and a plurality of rectification output terminals, said rectification means having said plurality of rectification input terminals and said plurality of rectification output terminals, said rectification means controlling current to occur only in predetermined directions through the rectification output terminals and the rectification input terminals, whereby an alternating-current power source at the rectification input terminals will result in full-wave rectification from the rectification output terminals, said output circuit being inclusive of said rectification means, and i) providing for connection of said rectification input terminals operatively to said plurality of secondary terminals, and j) providing a current-compliant impedance, and a predetermined impedance current maximum magnitude, and an impedance voltage drop across said current-compliant impedance, and a predetermined impedance voltage drop maximum magnitude, whereby said impedance voltage drop across said current-compliant impedance due to said predetermined impedance current maximum magnitude does not exceed said predetermined impedance voltage drop maximum magnitude, and k) providing a plurality of working voltages, and a working voltage maximum magnitude, said plurality of working voltages consisting of all voltages present in said output circuit, said plurality of working voltages having said working voltage maximum magnitude, said working voltage maximum magnitude being limited to voltages present on said plurality of secondary terminals, and l) providing for connection of said current-compliant impedance operatively to the rectification output terminals, whereby said rectification means will clamp said working voltage maximum magnitude to said impedance voltage drop across said current-compliant impedance, whereby said output circuit will have said working voltage maximum magnitude substantially clamped to said predetermined impedance voltage drop maximum magnitude.

* * * * *